US006462160B1

(12) United States Patent
Ogawa et al.

(10) Patent No.: US 6,462,160 B1
(45) Date of Patent: Oct. 8, 2002

(54) MASKING MATERIAL

(75) Inventors: Masanori Ogawa; Katsumi Terada; Kuninori Ito, all of Tokai (JP)

(73) Assignee: Nagoya Oilchemical Co., Ltd., Aichi (JP)

( * ) Notice: Subject to any disclaimer, the term of this patent is extended or adjusted under 35 U.S.C. 154(b) by 0 days.

(21) Appl. No.: 09/763,849

(22) PCT Filed: Sep. 6, 1999

(86) PCT No.: PCT/JP99/04825

§ 371 (c)(1), (2), (4) Date: Feb. 27, 2001

(87) PCT Pub. No.: WO00/13804

PCT Pub. Date: Mar. 16, 2000

(30) Foreign Application Priority Data

Sep. 7, 1998 (JP) ........................................... 10-252289
Sep. 29, 1998 (JP) ........................................... 10-275602

(51) Int. Cl.$^7$ ............................................... C08F 112/08

(52) U.S. Cl. .................... 526/346; 526/347.2; 526/348; 526/351; 526/352

(58) Field of Search ................................. 526/170, 346, 526/347.2, 348, 351, 352

(56) References Cited

U.S. PATENT DOCUMENTS 5,914,370 A * 6/1999 Okada et al. ................. 525/63
5,962,599 A * 10/1999 Abe et al. ............... 526/160 X
6,184,316 B1 * 2/2001 Masi et al. ............. 526/143 X

FOREIGN PATENT DOCUMENTS

JP 07-228845 A * 8/1995

* cited by examiner

*Primary Examiner*—Fred Teskin
(74) *Attorney, Agent, or Firm*—Cooper & Dunham LLP; Donald S. Dowden

(57) ABSTRACT

A masking member is provided that can be used repeatedly even for surface treatments at a high temperature. The masking member includes a plastic produced by polymerization using a metallocene compound as a catalyst or a polymer alloy containing such a plastic.

8 Claims, 26 Drawing Sheets

MASKING MATERIAL

FIELD OF THE INVENTION

The present invention relates to a masking member used to protect the position where coating should not be effected.

PRIOR ART

Said masking member may be attached to said position to be protected from surface treatment by an adhesive layer in a case where said position is flat or a hole, an inserting part is formed in said masking member and said masking member may be attached to said position by inserting said inserting part in a case where said position is a hole, an inserting groove is formed in said masking member and said masking member may be attached by inserting said position in said inserting groove in a case where said position is panel shaped, or an inserting hole is formed in said masking member and said masking member may be attached to said position by inserting said position in said inserting hole in a case where said position is protrusion shaped. And said masking member may be removed from said position after surface treatment.

Hitherto, a masking member consisting of a thermoplastic resin in which an inorganic filler is mixed has been provided (Tokkai Hei 2-126966).

Polyolefin resin is a specially preferable thermoplastic resin since said polyolefin resin has good solvent resistance and when an inorganic filler is mixed in said polyolefin resin, said polyolefin resin is mechanically reinforced and the heat resistance of said polyolefin resin is improved by giving high thermal conductivity to said polyolefin resin such that said masking member can be reused.

DISCLOSURE OF THE INVENTION

However, said traditional masking member has heat resistance for about 150° C. at most even if an organic filler is mixed in said polyolefin resin and said traditional masking member has a fault that said masking member may be deformed in the surface treatment process wherein heating at a higher temperature is required.

Further, a masking member consisting of an engineering plastic has been proposed but said engineering plastic may be expensive and have poor moldability.

To solve said problems, the present invention provides a masking member consisting of a plastic which is produced by polymerization using a metallocene compound as a catalyst and further a masking member consisting of a polymer alloy containing a plastic which is produced by polymerization using a metallocence compound as a catalyst. Desirably said plastic is a polyolefin resin or a polystyrene resin and a syndiotactic polystyrene resin is an especially desirable plastic.

BRIEF DESCRIPTION OF THE DRAWINGS

FIG. 28 is the perspective view of a car-body of the practical example.

FIG. 29 is the explanatory perspective view of Part A of the practical example.

FIG. 30 is the explanatory perspective view of Part B of the practical example.

FIG. 31 is the explanatory perspective view of Part C of the practical example.

FIG. 32 is the explanatory perspective view of Part D of the practical example.

FIG. 33 is the explanatory perspective view of Part E of the practical example.

In the drawings,

(31)~(319) . . . masking member

(31A)~(319A) . . . body

DETAILED DESCRIPTION OF THE INVENTION

Figure 1:
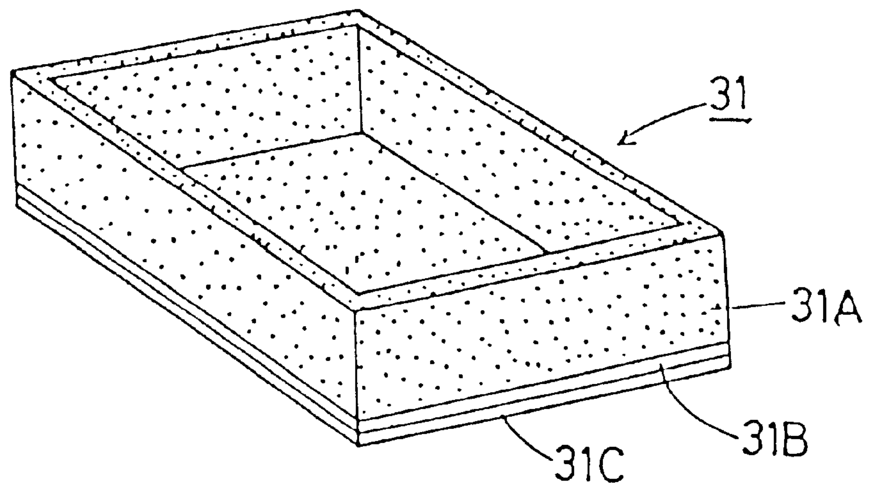
FIG. 1 is the perspective view of the first embodiment.

A plastic used as material for a masking member of the present invention is a plastic which is produced by polymerization using a metallocene compound as a catalyst (said plastic is called "metallocene plastic" hereafter) or a plastic consisting of a polymer alloy containing said metallocene plastic.

Said metallocene plastic may include a polyolefin resin such as a polyethylene resin, a polypropylene resin, an ethylene-propyrene copolymer and the like, a polystyrene resin and the like.

A desirable metallocene plastic may be a syndiotactic polystyrene resin. Said syndiotactic polystyrene resin has low specific gravity, good hydrolysis resistance and good moldability originated from a general polystyrene resin and further has good heat resistance (melting point 270° C.), good chemical resistance (resistance against acid, alkali, oil, aliphatic solvent, and the like), and good dimensional stability (having a small coefficient of linear expansion and small dimensional change by moisture absorption originated from a crystalline polymer).

A well known metallocene compound used as a polymerization catalyst can be used in the present invention and said metallocene compound has the following formula:

$$[(\eta^5\text{—}C_5\ R1_h)pR3_s(\eta^5\text{—}C_5\ R2_i)]MeQ_{3-p}$$

or $$[(R1\ N)R3_s(\eta^5\text{—}C_5\ R1_h)]MeQ$$

Wherein Me is an element belonging to 3A group, 4A group, or 5A group in the periodic table, said element selected from Y, Sc, Lanthanoid, Ti, Zr, Hf, V, Nb and Ta.

$(\eta^5\text{—}C_5\ R1_h)$ and $(\eta^5\text{—}C_5\ R2_i)$ are a cyclopentadienyl group or a substituted cyclopentadienyl group respectively, R1 and R2 are a hydrogen, an alkyl group, an alkenyl group, an aryl group, an alkyl aryl group, an aryl alkyl group, an alkyl silyl group or a silyl alkyl group having 1 to 20 carbon element(s) respectively. R1 and R2 may have a ring form by ring-closing reaction and each R1 may be the same group or the different group and each R2 may be the same group or the different group, too.

R3 is an alkylene group, a dialkylgermilen group, or an alkylsilylen group having 1 to 4 carbon element(s) and R3 connects $(\eta^5\text{—}C_5\ R1_h)$ ring and $(\eta^5\text{—}C_5\ R2_i)$ ring or $(\eta^5\text{—}C_5\ R1_h)$ ring and (R1 N).

Q is hydrogen, halogen, hydrocarbon having 1 to 20 carbon element(s).

s and p are 0 or 1, s is 0 when p is 0, h and i are 4 respectively when s is 1, and when s is 0, h and i are 5 respectively.

Said metallocene compound may be selected according to the kind of the plastic produced by polymerization and to produce polyethylene or copolymer of ethylene, bis(cyclopentadienyl)titanium dichloride, bis(methylcyclopentadienyl)zirconium dimethyl, bis(pentamethylcyclopentadienyl)zirconium dichloride, bis(n-butylcyclopentadienyl)zirconium dichloride, bis(trimethylsilylcyclopentadienyl)hafnium dimethyl, ethylenebis(1-indenyl)zirconium dichloride, ethylenebis(4,5,6,7-tetrahydroindenyl)zirconium dichloride, dimethylsilylenebis(1-indenyl)zirconium dichloride, dimethylsilylenebis(1-indenyl)zirconium dimethyl, dimethylsilylenebis(benzoindenyl)zirconium dichloride, and the like may be used.

To produce isotactic polypropylene, ethylenebis(1-indenyl)zirconium dichloride, ethylenebis(4,5,6,7-tetrahydroindenyl)zirconium dichloride, dimethylsilylenebis(1-indenyl)zirconium dichloride, dimethylsilylenebis(1-indenyl)zirconium dimethyl, dimethylsilylenebis(benzoindenyl)zirconium dichloride, dimethylsilylenebis(2-methyl-4-naphthylindenyl)zirconium dichloride, dimethylsilylenebis(2-methylindenyl)zirconium dichloride, dimethylsilylenebis(2-methyl-4-isopropylindenyl)zirconium dichloride, dimethylsilylenebis((2-methyl-4-phenylindenyl)zirconium dichloride, isopropylidene(3-t-buthylcyclopentadienyl)(3-tbuthylindenyl)titanium dichloride, isopropylidene(3-t-buthylcyclopentadienyl)(3-tbuthylindenyl)zirconium dichloride, dimethylsilylene(3-t-buthylcyclopentadienyl) fluorenylzirconium dichloride, and the like may be used. Two or more kinds of said metallocene compounds may be used together to produce polyethylene, copolymer of ethylene or isotactic polypropylene.

To produce syndiotactic polypropylene, isopropylidene (cyclopentadienyl) fluorenylzirconiumdichloride may be preferably used and to produce syndiotactic polystyrene, cyclopentadienyltitaniumtrichloride may be preferably used.

When said metallocen compound is used as a polymerization catelyst, usually a promoter is used. The well known promoter and typical promoter is an aluminoxane such as $Al_2$ OR $(Al(R)\text{—}O)_n$, $(Al(R)\text{—}O)_{n=2}$ and the like, wherein n is an integral number 4 to 20, R is a methyl group or an ethyl group may be used.

An Organoaluminiumhalide compound such as diethylaluminium chloride and the like, borate such as tetraphenyl borate, tetrakis (pentafluorophenyl) borate and the like may also be used as a promoter.

Said polymer alloy may consist of said metallocene plastic and other thermoplastic resin. Said thermoplastic resin may be polyethylene, polypropylene, ethylene-propylene copolymer, ethylene-vinyl acetate copolymer, ethylene-vinyl chloride copolymer, vinyl chloride type resin, vinylidene chloride type resin, stylene type resin, acrylic type resin, methacrylic type resin, vinyl propionate type resin, vinyl acetate maleic acid type resin, vinyl chloride-vinyl acetate type resin, polyvinylether type resin, and the like, further engineering plastic such as polyamide(PA), polyester(PE), polyacetal(POM), polycarbonate(PC), poly (ethylene terephthalate)(PET), poly(butylene terephthalate) (PBT), polysulfone(PSF), polyethersulfone(PES), polyphenyleneoxide(PPO), polyphenylenesulfide(PPS), polyarilate(PAR), polyetheretherketone(PEEK), polyamideimide(PAI), polyimide(PI), polyether(PEI), polyaminobismaleimide, methylpentene copolymer(TPX) and further cellulose acetate, fluoro carbon resin such as polytetrafluoroethylene (PTFE) and the like. A preferable polymer alloy may be PPO-syndiotactic polystyrene polymer alloy, PPO-isotactic polypropylene polymer alloy, PPO-syndiotactic polypropylene polymer alloy, PPO-polyethylene polymer alloy, PE-syndiotactic polystyrene polymer alloy and the like.

A material plastic, which means said metallocene plastic or polymer alloy thereof, may be a foam and a mixture of said material plastics.

A filler such as calcium carbonate, magnesium carbonate, barium sulfate, calcium sulfite, magnesium hydroxide, aluminum hydroxide, magnesium oxide, titanium oxide, iron oxide, zinc oxide, alumina, silica, diatomaceous earth, dolomite, gypsum, talc, clay, asbestos, mica, calcium silicate, bentonite, white carbon, carbon black, iron powder, aluminum powder, glass powder, stone powder, synthetic resin powder, blast furnace slag, flyash, synthetic fiber, natural fiber, glass fiber, carbon fiber, ceramic fiber, whisker, rock wool, asbestos and the like may be added to said material plastic. Said filler may usually be added to said material plastic in 0.5 to 200% by weight.

A thermoplastic resin such as polyolefin comprising polyethylene, polypropylene, ethylene-propylene copolymer, ethylene-vinylacetate copolymer and the like, polyvinyl chloride, polystyrene, polymethacrylate, polyvinylidene chloride, styrene-butadiene copolymer, polyester, polyamide and the like, foam such as thermoplastic resin foam made of said thermoplastic resin described above, polyurethane foam and the like may be added to said material plastic. Further, natural rubber, synthetic rubber such as acrylic rubber, butyl rubber, silicone rubber, urethane rubber, fluoride type rubber, polysulfide synthetic rubber, grafted rubber, butadiene rubber, isoprene rubber, chloroprene rubber, polyisobutylene rubber, polybutene rubber, isobutene-isoprene rubber, acrylate-butadiene rubber, styrene-butadiene rubber, acrylonitrile-chloroprene rubber, styrene-chloroprene rubber and the like, and thermoplastic elastomer may be added to said material plastic, wherein said thermoplastic elastomer comprises styrene type thermoplastic elastomer such as styrene-butadiene-styrene copolymer (SBS), styrene-isoprene-styrene copolymer (SIS), styrene-ethylene/butadiene-styrene copolymer (SEBS), styrene-ethylene/isoprene-styrene copolymer (SEPS) and the like, polyolefin-type thermoplastic elastomer, polyvinylchloride-type thermoplastic elastomer, polyurethane-type thermoplastic elastomer, polyamide-type thermoplastic elastomer and the like. Two or more kinds of said thermoplastic resins, said foam, said natural rubbers, said synthetic rubbers, and said thermoplastic elastomers may be added to said material plastic as a mixture thereof. As the masking member of this invention, these materials may be laminated on said material plastic or be adhered to said material plastic.

For example, it prevents a position masked by said masking member from being scratched that a sheet which is made from the plastic foam, the rubber, or the thermoplastic elastomer, described above, may be laminated on part of or all of the reverse of the masking member of this invention or be adhered to part of or all of the reverse of the masking member of this invention. In the same way, a sheet such as non woven fabric, knitted and woven fabrics, felt and the like may be laminated on part of or all of the reverse of the masking member of this invention or be adhered to part of or all of the reverse of the masking member of this invention.

In order to enhance affinity between the surface of the masking member of this invention and paint or adhesive, treatment such as corona discharge treatment, primer coating treatment and the like, may be done. Also to make affinity between the surface of masking member of this invention and paint or adhesive less intense, release treatment may be done. As a polyolefin resin does not have sufficient affinity with paint or adhesive particularly, enhancement of said affinity is desirable. As a result of enhancement of said affinity, it is able to prevent a paint film adhered to said masking member from peeling off by spray pressure and the like, and from contaminating the surrounding painted-part by a flying paint film in the case of reusing said masking member.

A primer used in said primer coating treatment is, for example: synthetic rubber such as modified polyolefin or an olefin copolymer such as chlorinated polypropylene, an ethylene-vinylacetate copolymer, styrene-butadiene rubber, acrylonitrile-butadiene rubber, chloroprene rubber, polybutadiene rubber and the like, synthetic resin such as an acrylic synthetic resin, a vinyl synthetic resin, an acrylic synthetic resin containing a functional group such as amino, amide and the like, a vinyl synthetic resin containing a functional group such as amino, amide and the like, an amino synthetic resin, an epoxy synthetic resin and the like; and a low-molecular weight primer such as an aluminum alcholate or an aluminum chelate agent such as aluminum isopropylate, tris(acetylacetonato)aluminum and the like; alkyl metal such as 2-ethylhexyl lead, hexadecyl lithium; an organotin compound such as dibutyl tin diacetate, di-n-butyl tin dioxide; a silane compound such as methylvinyldichloro silane and the like; metal complex salt of 1,3-dicarbonyl compound such as acetylacetone lithium, acetylacetone beryllium and the like; an organotitanium compound such as tetrabutyl titanate and the like; a boric acid compound such as tri-n-butyl borate, triphenyl borate and the like; phosphate such as trioleil phosphate, tridecyl phosphate and the like; metal salt of a carboxylic acid such as magnesium stearate, cobalt naphthenate and the like; metal tioalcholate such as n-dodecylmercapto potassium salt and the like; tiodicarboxylate salt such as zinc 2-ethylhexanedithiocarboxylate and the like; ditiocarbamate salt such as nickel dimethyldithio carbamate, copper dimethyldithio carbamate and the like; sulfonate such as nickel benzensulfonate sulfonate and the like; an olganophosphate compound such as vanadium dibutylphosphate and the like. One or more kinds of said primers may be mixed together.

Said primer has affinity with both said metallocene plastic or said polymer alloy and a synthetic resin other than said metallocene plastic or said polymer alloy which is generally used as a paint vehicle or an adhesive for said metallocene plastic or said polymer alloy. A preferable primer is an acrylic synthetic resin containing an amino group. For primer coating treatment, a solution or an emulsion of one or more kinds of said primer is coated on the surface of said metallocene plastic or said polymer alloy as material for the masking member and then dried.

Prior to said primer coating treatment, affinity treatment may be effected on the surface of said masking member. The examples of said affinity treatment are flame treatment, sulfuric acid treatment, corona discharge treatment and the like, and the surface of said metallocene plastic is slightly carbonized by said treatment to obtain affinity with other synthetic resins.

Further, the examples of a release agent used for the surface treatment of said masking member are a silicone type release agent, a fluoro type release agent, a fatty acid type release agent, a praffine type release agent, a wax type release agent and the like.

For releasing treatment, a solution or an emulsion of one or more kinds of said releasing agent or a melted releasing agent is coated on the surface of said masking member and then dried or cooled.

Said masking member may be colored by a pigment or a dyestuff to discriminate the masking parts, and also, a flame-retardant, an insecticide, an antiseptic, an antioxidant, an ultraviolet absorber, a blowing agent such as a chemical blowing agent, a capsule-type blowing agent and the like may be mixed and then added to said masking member.

To manufacture the masking member using a raw material containing mainly said material plastics, it may be preferable to employ a method comprising melting said raw material to form a film or a sheet and vacuum forming said film or sheet to mold a desirable shape because said method may be suitable for mass-production, but hot-press, blow molding, injection molding may be employed besides said vacuum forming. Further said film or said sheet (green sheet) made of said raw material containing mainly said material plastics may be stretched or non stretched.

It is desirable to heat at a temperature higher than the crystallization temperature to crystallize. By crystallization of said material plastics, the properties such as heat resistance, mechanical strength may be improved. For instance said green sheet may be hot-pressed at a temperature higher than the crystallization temperature or vacuum formed at a temperature lower than the crystallization temperature and then heated at a temperature higher than the crystallization temperature. Said method is a preferable method since the press machine equipped with the heater may not be necessary in said method such that the cost of equipment can be reduced. Nevertheless said heat treatment after vacuum forming needs care to maintain the shape of the molded masking member.

Though the thickness of said green sheet described above is usually within 0.01 to 3 mm, the thickness of said green sheet is not restricted in this invention. In the case of laminating or adhering a flaw prevention sheet, which is described above as the sheet made of plastic foam, rubber, a thermoplastic elastomer, non-woven fabric, knitted and woven fabrics, felt and the like, on part of or all of the reverse of the masking member, a state of a lamination consisting of said flaw prevention sheet and said green sheet may be molded, or said flaw prevention sheet may be adhered with said green sheet after molding said green sheet.

A broken piece, remaining after trimming of said molded green sheet, comprises a metallocene plastic or a polymer alloy thereof mainly. Said broken piece is capable of recycling irrespective of ability of crystallization. Said broken piece can be molded in a desirable shape after forming it into a film or sheet melting it again, wherein it is unnecessary to make said broken piece to pellet. Thus said broken piece can maintain original physical property in spite of reusing said broken piece.

ACTION

When polymerization is carried out using a metallocene compound as a catalyst, a stereoregular polymer, an isotactic polymer and a syndiotactic polymer, can be produced and said stereoregular polymer has good heat resistance and high mechanical strength. Further, a polymer alloy containing said metallocene plastic has both properties of a metallocene polymer and properties of other thermoplastic resins used in a polymer alloy.

Accordingly, the masking member consisting of said metallocene plastic or said polymer alloy may not deform at a temperature higher than 150° C. and have high mechanical strength.

Further, a polyolefine resin, a polystyrene resin and the like may be unexpensive and have good moldability, low moisture absorption, and good dimensional stability.

EMBODIMENTS

[Masking Member Type A]

Masking member Type A is used to protect the even surface of an article.

Figure 2:
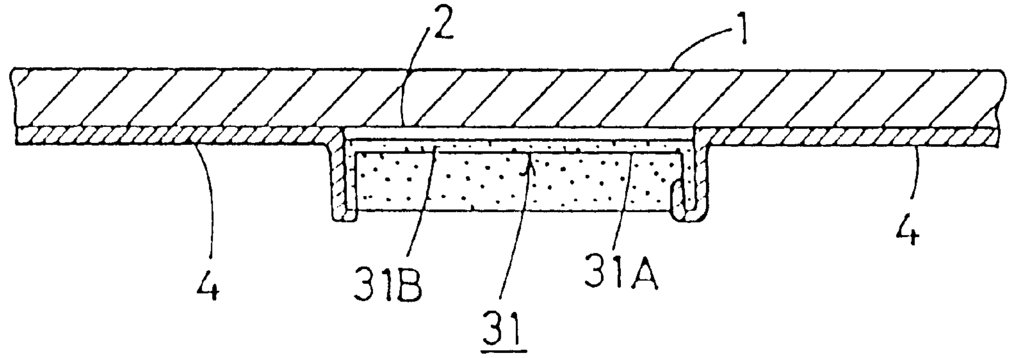
FIG. 2 is the partial sectional view of the first embodiment when the masking member is attached.
Figure 3:
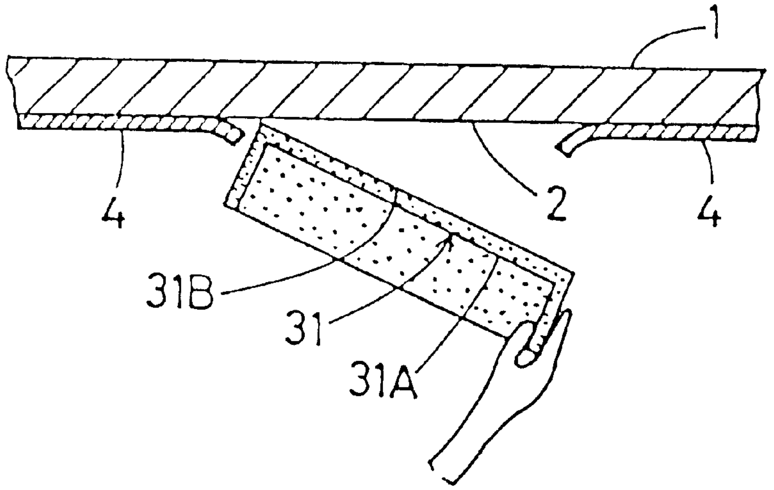
FIG. 3 is the partial sectional view of the first embodiment when the masking member is removed.

FIG. 1 to FIG. 3 relate to the first embodiment of the present invention. Referring now to FIG. 1 to FIG. 3, a masking member (31) comprises a body (31A) having a vessel form consisting of a rectangular bottom and an adhesive layer (31B) formed on the under surface of said body (31A). Said body (31A) consists of metallocene polyethylene polymerized by using bis(cyclopentadienyl) titaniumdichloride. After the vacuum forming of the metallocene polyethylene sheet, said sheet is treated by heating to crystallize said metallocene polyethylene. Said adhesive layer (31B) is covered with a release sheet (31C) such as a polyethylene film, a polypropylene film, a release paper and the like to prevent sticking to another article, the hands of workers and the like when the masking members are handled, stacked, transported, kept and the like.

When said masking member (31) is used, said release sheet (31C) is removed from said adhesive layer (31B) and said masking member (31) is then attached to an even part (2) of the surface of an article (1) by said adhesive layer (31B) thereof, which is necessary to be protected from surface treatment. After said masking member (31) is attached to said part (2), for example, a coating material is coated on the surface of said article (1) by spraying as shown in FIG. 2. Said part (2) of said surface of said article (1) is not subjected to said coating since said part (2) is covered with said masking member (31). Said part (2) may have hole(s) and in this case, said hole(s) is (are) not subjected to said coating, either.

After or before said coated article is heated to dry and/or cure if desired, and said masking member (31) may be removed by a worker's hand as shown in FIG. 3.

Said masking member (31) consisting of the above mentioned sheet is easily manufactured by vacuum forming and can be reused without deformation.

Further in a case when silicone treatment is effected on the surface of said masking member (31), affinity of the surface of said masking member (31) with paint reduces and the film of paint is easily peeled from the surface of said masking member (31) so that said masking member (31) can be repeatedly used after peeling the film of paint.

Figure 4:
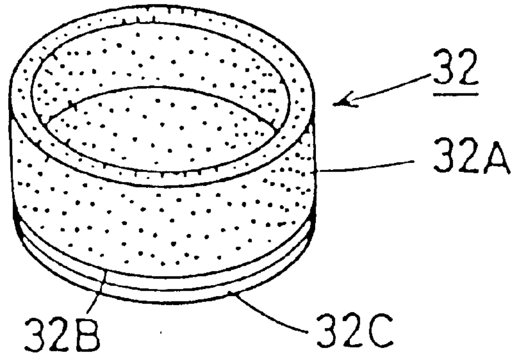
FIG. 4 is the perspective view of the second embodiment.

FIG. 4 relates to the second embodiment of the present invention. In this embodiment, a masking member (32) comprises a body (32A) having a vessel form consisting of a circular bottom and an adhesive layer (32B) formed on the under surface of said body (32A). Said body (32A) consists of isotactic polypropylene polymerized by using ethylenebis (l-indenyl)zirconiumdichloride. After the injection molding of the sheet, said sheet is treated by heating to crystallize said isotactic polypropylene. Said adhesive layer (32B) is covered with a release sheet (32C).

The masking member (32) of this embodiment is attached to an even part of the surface of an article by said adhesive layer (32B) in the same way as a masking member (31) of the first embodiment, and said part may have hole(s). And said masking member (32) is easily manufactured by vacuum forming and can be reused in the same way as the first embodiment.

Figure 5:
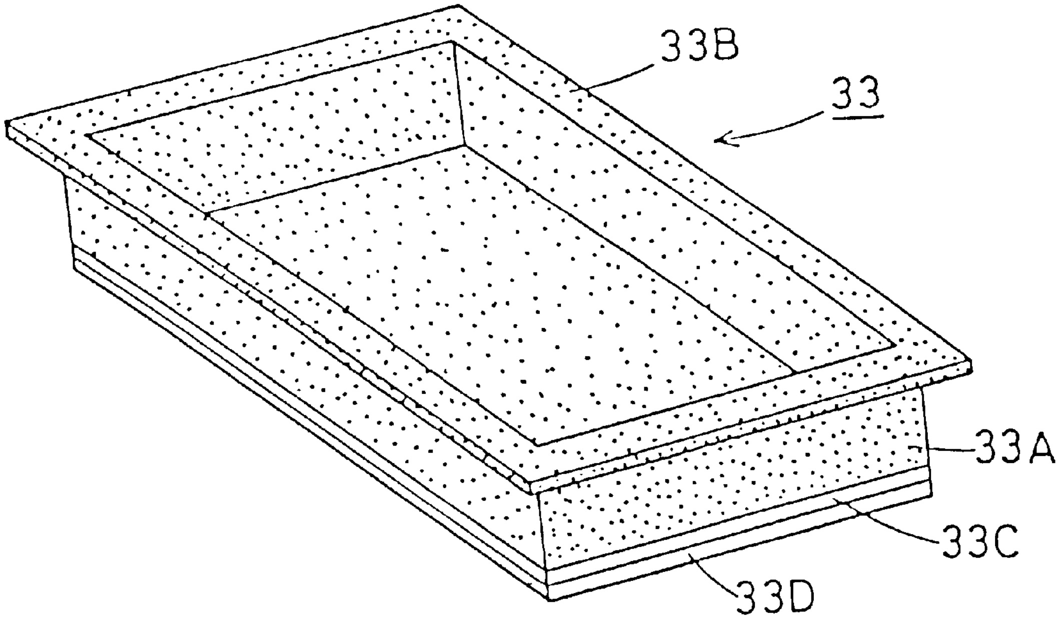
FIG. 5 is the perspective view of the third embodiment.
Figure 6:
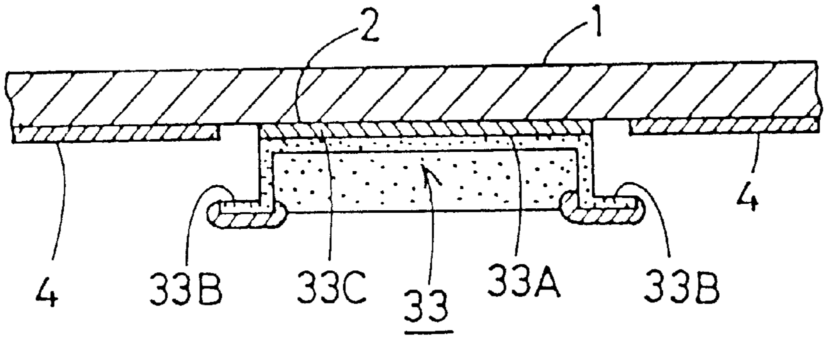
FIG. 6 is the partial sectional view of the third embodiment when the masking member is attached.
Figure 7:
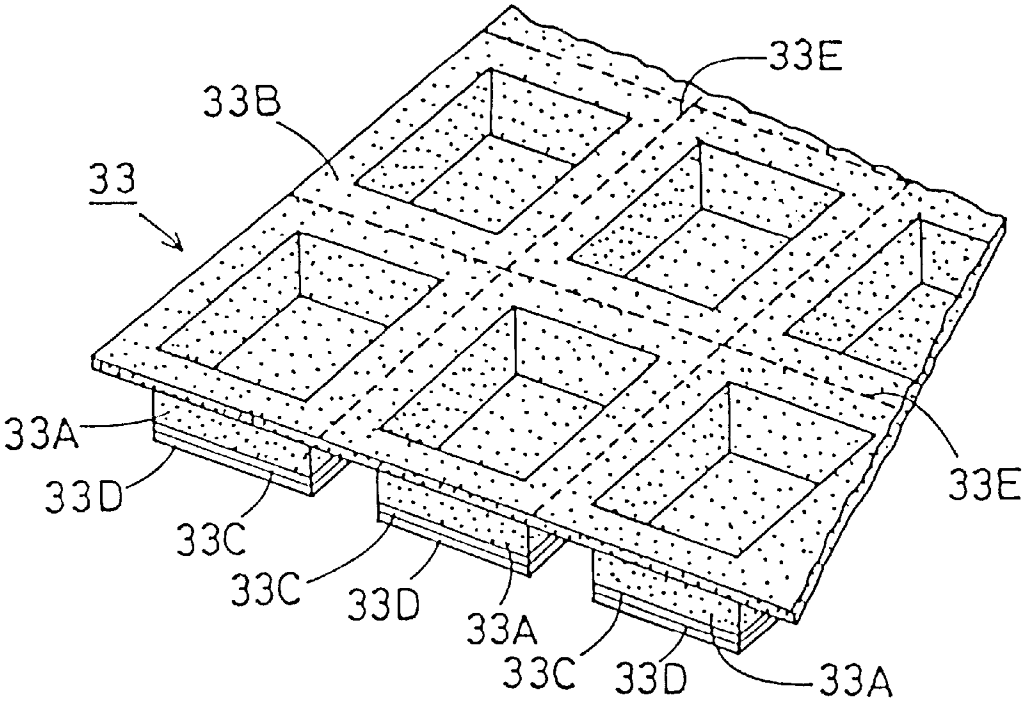
FIG. 7 is the partial perspective view of the third embodiment when the masking members are produced.

FIG. 5 to FIG. 7 relate to the third embodiment of the present invention. Referring now to FIG. 5 to FIG. 7, a masking member (33) comprises a body (33A) having a vessel form consisting of a rectangular bottom and perpendicular walls which extend upwards from the perimeter of said bottom, and a flange (33B) which is extended from the upper edges of said walls and an adhesive layer (33C) formed on the under surface of said body (33A). Said body (33A) consists of syndiotactic polypropylene polymerized by using isopropylidene(cyclo pentadienyl) fluorenylzirconiumdichloride. In the vacuum forming of the syndiotactic polypropylene sheet, said sheet is treated by heating to crystallize said syndiotactic polypropylene. An adhesive layer (33C) is formed on the under surface of said body (33A) and said adhesive layer (33C) is covered with a release sheet (33D). Said masking member (33) is attached to an even part (2) of the surface of an article (1) in the same way as the first embodiment of the present invention.

In this embodiment, said coating layer (4) is cut by said flange (33B) of said masking member (33) as shown in FIG. 6. As a result, said masking member (33) may smoothly be removed from said part (2) of said surface of said article (1) by a worker's hand without obstruction of said coating layer (4). Said masking member (33) is easily manufactured by vacuum forming and can be reused in the same way as the first embodiment.

A number of masking members (33) of this embodiment may advantageously be produced by vacuum forming, if desired. Referring to FIG. 7, a number of bodies (33A) of masking member (33) are formed and arranged in rows and lines, and each body (33A) is connected to another body (33A) by the flange (33B). Cutting lines or grooves (33E) are formed between said flange (33B) and said another flange (33B) and when said masking member (33) is used, said masking member (33) is broken along said cutting lines or grooves (33E) by hand. Said cutting lines or grooves (33E) may be formed simultaneously with vacuum forming or after vacuum forming.

Figure 8:
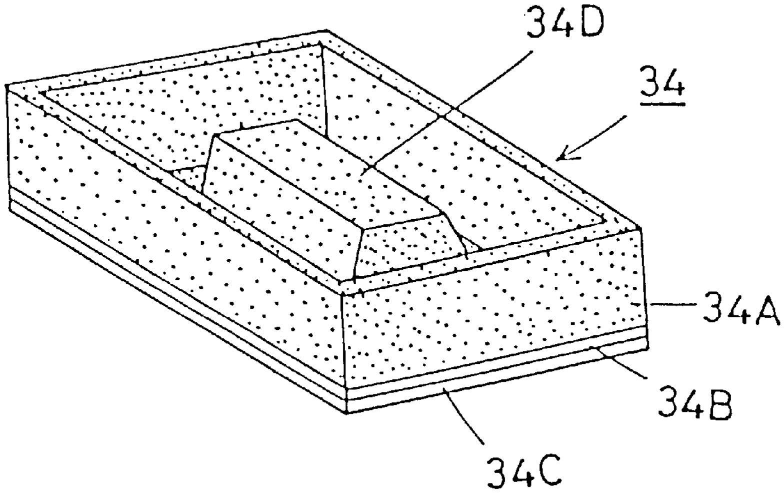
FIG. 8 is the perspective view of the fourth embodiment.

FIG. 8 relates to the fourth embodiment of the present invention. In this embodiment, a masking member (34) comprises a body (34A) having a vessel form consisting of a rectangular bottom from which a grip (34D) is risen and perpendicular walls which extend upwards from the perimeter of said bottom and an adhesive layer (34B) formed on the under surface of said body (34A). Said body (34A) consists of syndiotactic polystyrene polymerized by using cyclopentadienyltitaniumtrichloride.

After the vacuum forming of the syndiotactic polystyrene sheet, said sheet is treated by heating to crystallize said syndiotactic polystyrene. Said adhesive layer (34B) is covered with a release sheet (34C) in the same way as the first embodiment.

The masking member (34) of this embodiment is easily handled by holding said grip (34D) of said masking member (34) and is easily manufactured by vacuum forming and can be reused in the same way as the first embodiment.

[Masking Member Type B]

Masking member Type B is used to protect an even surface or a protruding part of an article. Said masking member B comprises a two-layer sheet consisting of said isotactic polypropylene sheet and said syndiotactic polypropylene sheet. After the vacuum forming of the two-layer sheet, said two-layer sheet is treated by heating to crystallize said isotactic polypropylene and said syndiotactic polypropylene.

Figure 9:
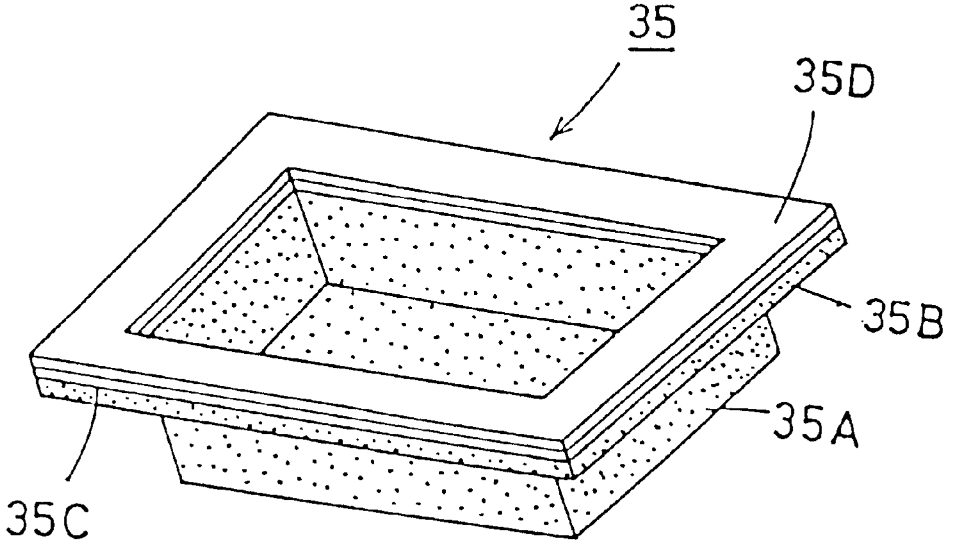
FIG. 9 is the perspective view of the fifth embodiment.
Figure 10:
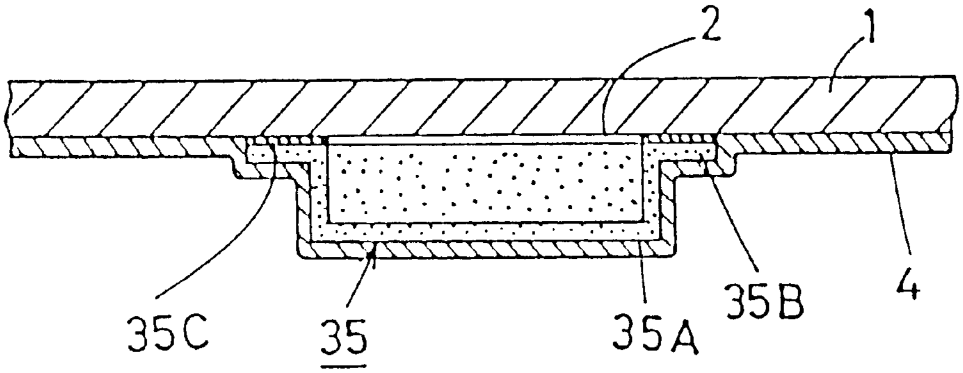
FIG. 10 is the partial sectional view of the fifth embodiment when the masking member is attached.

FIG. 9 and FIG. 10 relate to the fifth embodiment of the present invention. Referring now to FIG. 9 and FIG. 10, a masking member (35) comprises a body (35A) having a vessel form consisting of a rectangular bottom, perpendicular walls which extend upward from the perimeter of said bottom, a flange (35B) which is extended from the upper edges of said walls, and an adhesive layer (35C) formed on the surface of said flange (35B). Said adhesive layer (35C) is covered with a release sheet (35D).

Figure 11:
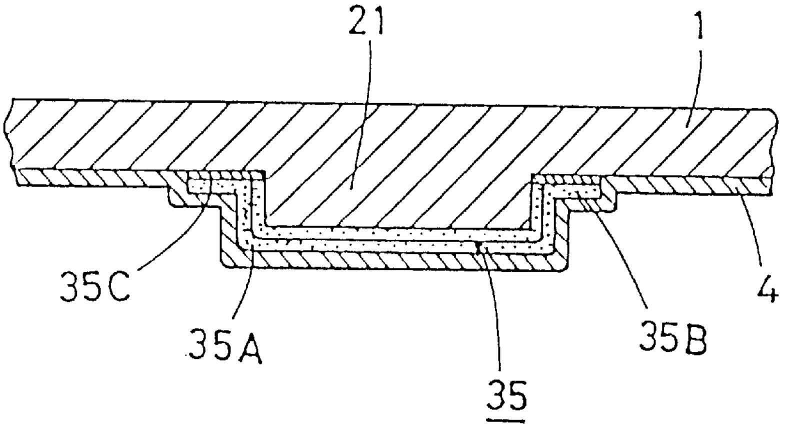
FIG. 11 is another partial sectional view of the fifth embodiment when the masking member is attached.

Referring to FIG. 10, when said masking member (35) is used, said release sheet (35D) is removed from said adhesive layer (35C) and said masking member (35) is then attached to an even part (2) of the surface of an article (1) by said adhesive layer (35C) thereof. After said masking member (35) is attached to said part (2) of said surface of said article (1), said part is not subjected to said coating since said part (2) is covered with said masking member (35). After forming a coating layer (4), said masking member (35) is removed by a worker's hand. Further, said even part (2) may have hole(s). And further, as shown in FIG. 11, said masking member (35) is also used to protect a protruding part (21) of said article (1) by covering said protruding part (21) with said masking member (35).

Said masking member (35) is easily manufactured by vacuum forming and can be reused without deformation.

Figure 12:
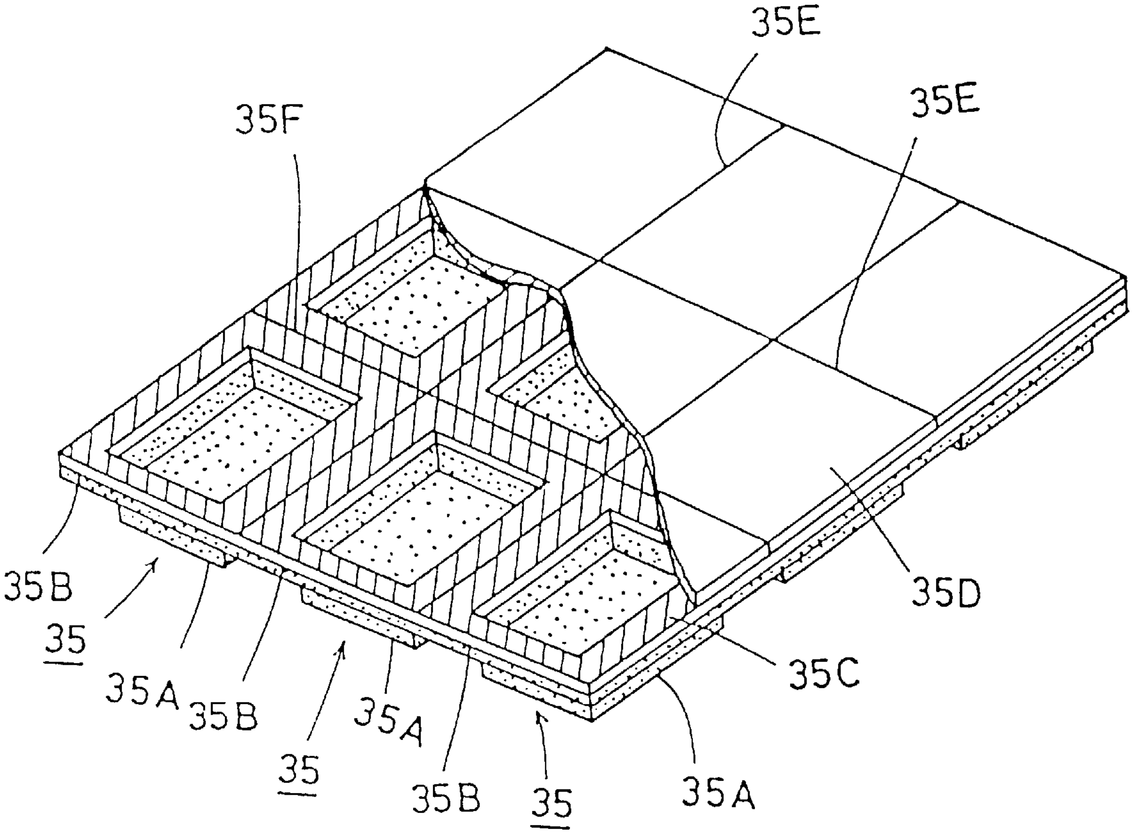
FIG. 12 is the perspective view of the fifth embodiment when the masking members are produced.

A number of masking members (35) of this embodiment may advantageously be produced by vacuum forming, if desired. Referring to FIG. 12, a number of bodies (35A) of said masking member (35) are formed and arranged in rows and lines, and each body (35A) is connected to another body (35A) by the flange (35B). Cutting lines or grooves (35F) are formed between said flange (35B) and said another flange (35B) corresponding to cutting lines (35E) formed on said release sheet (35D), and when said masking member (35) is used, said masking member (35) is broken along said cutting lines or grooves (35F) by hand. Said cutting lines or grooves (35F) may be formed simultaneously with vacuum forming or after vacuum forming.

Figure 13:
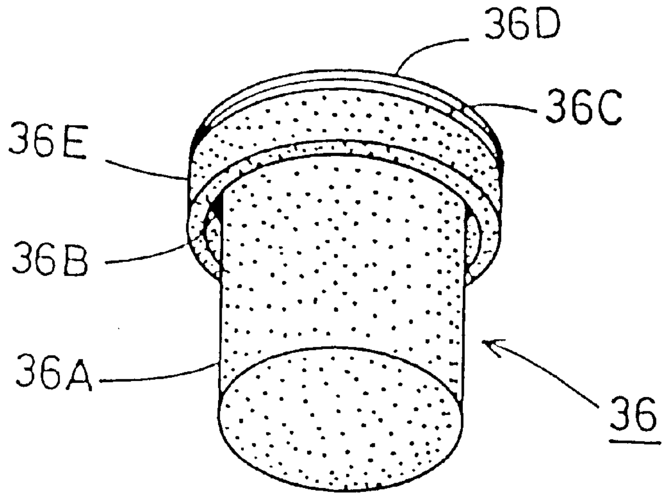
FIG. 13 is the perspective view of the sixth embodiment.
Figure 14:
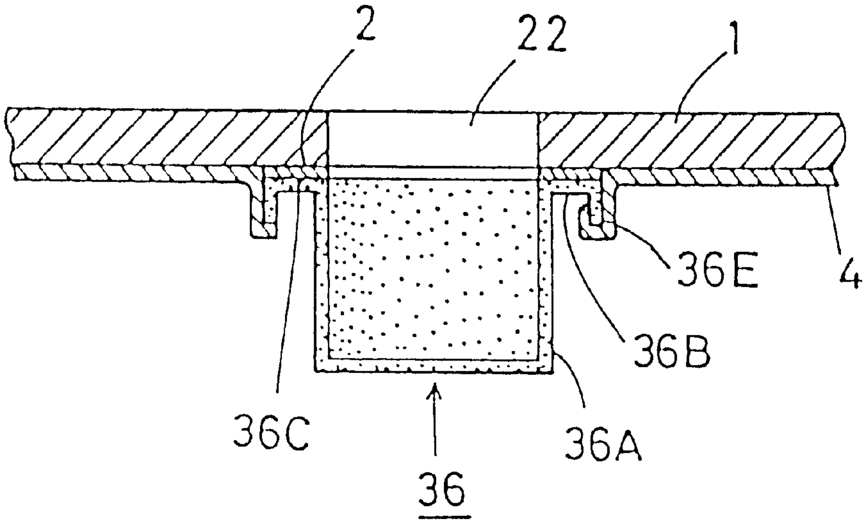
FIG. 14 is the partial sectional view of the sixth embodiment when the masking member is attached.

FIG. 13 and FIG. 14 relate to the sixth embodiment of the present invention. In this embodiment, a masking member (36) comprises a body (36A) having a vessel form consisting of a circular bottom, an inner perpendicular wall which extends upwards from the circumference of said bottom, a flange (36B) which is extended from the upper edge of said wall, and an outer perpendicular wall (36E) which extends downwards from the perimeter of said flange (36B), and an adhesive layer (36C) formed on the surface of said flange (36B). Said adhesive layer (36C) is covered with a release sheet (36D).

When said masking member (36) is used, said release sheet (36D) is removed from said adhesive layer (36C) and said masking member (36) is then attached to an even part (2) of the surface of an article (1) by said adhesive layer (36C) thereof, and said part (2) has a hole (22). After said masking member (36) is attached to said part (2), coating is effected on the surface of said article (1) to form a coating layer (4) as shown in FIG. 14. Said masking member (36) can be removed from said part (2) of said article (1) by a worker's hand without obstruction of said coating layer (4). Said masking member (36) is easily manufactured by vacuum forming and can be reused in the same way as the fifth embodiment. Further, said part (2) of said article (1) may be an even part without a hole (22).

[Masking Member Type C]

Masking member Type C is used to protect hole(s) of an article. Said masking member C comprises syndiotactic polystyrene (XAREC S930 product of Idemitsu Petrochemical Co., Ltd.). In the vacuum forming of the syndiotactic polystyrene sheet, said sheet is treated by heating to crystallize said syndiotactic polystyrene.

Figure 15:
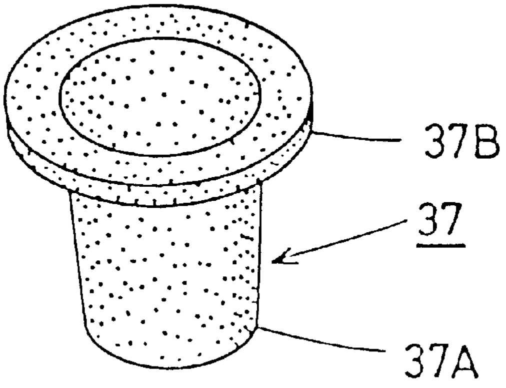
FIG. 15 is the perspective view of the seventh embodiment.
Figure 16:
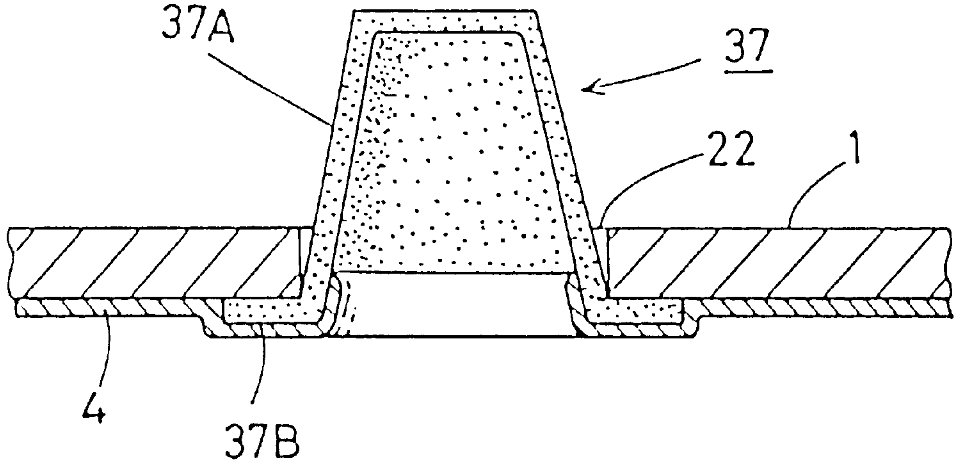
FIG. 16 is the partial sectional view of the seventh embodiment when the masking member is attached.

FIG. 15 and FIG. 16 relate to the seventh embodiment of the present invention. In this embodiment, a masking member (37) consists of an inserting part (37A) having a vessel form consisting of a circular bottom and a perpendicular wall which extends upwards from the circumference of said bottom, and a flange (37B) which is extended from the upper edge of said wall.

When said masking member (37) is used, said masking member (37) protects the inside of a hole (22) of an article (1) by inserting said inserting part (37A) into said hole (22) as shown in FIG. 16 and said flange (37B) of said masking member (37) covers the surroundings of said hole (22).

After that, coating is effected on the surface of said article (1) to form a coating layer (4) as shown in FIG. 16 and the inside and surroundings of said hole (22) are not subjected to said coating. After said coating, said masking member (37) may be removed from said hole (22) by hand. As said masking member (37) has good heat resistance and does not deform during the curing process of said coating layer (4), said masking member (37) can be reused.

Further in a case where primer coating treatment using an acrylic synthetic resin including a quaternary ammonium salt is effected on the surface of said masking member (37), the film of paint may be strongly bonded with the surface of said masking member (37) and after heat treatment, said film of paint does not peel from the surface of said masking member (37) so that pieces of film of paint peeling from the surface of said masking member (37) are not formed and contamination of the circumference by said pieces of the film of paint can be avoided. Accordingly, said masking member (37) may preferably be used repeatedly without peeling the film of paint.

Figure 17:
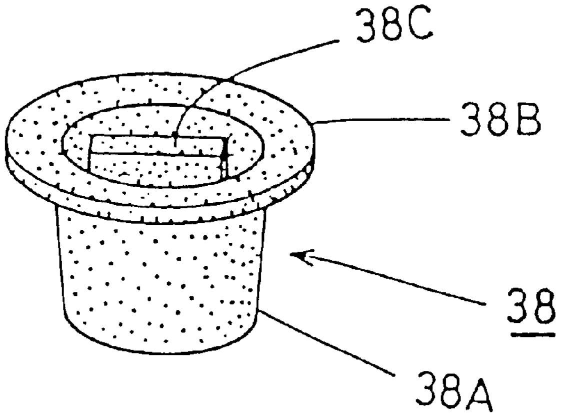
FIG. 17 is the perspective view of the eighth embodiment.

FIG. 17 relates to the eighth embodiment of the present invention. In this embodiment, a masking member (38) comprises an inserting part (38A) having a vessel form consisting of a circular bottom from which a grip (38C) is risen, and a perpendicular wall which extends upwards from the circumference of said bottom, and a flange (38B) which is extended from the upper edge of said wall.

Said masking member (38) of this embodiment is used in the same way as the seventh embodiment and is easily handled by holding said grip (38C) when said masking member (38) is inserted into the hole of the article or removed from the hole. Said masking member (38) is easily manufactured by vacuum forming and can be reused in the same way as the seventh embodiment.

Figure 18:
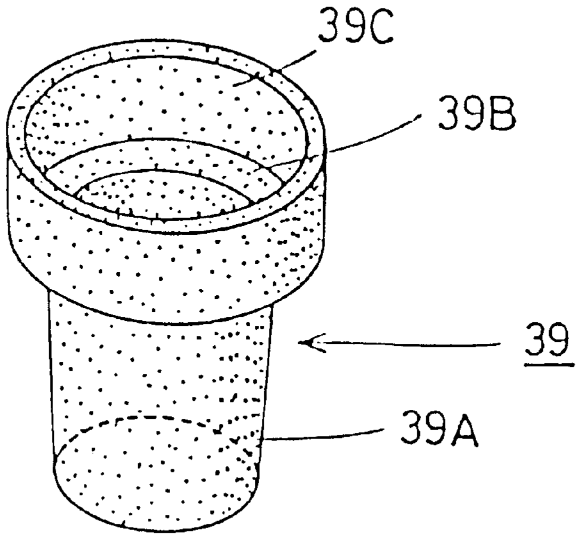
FIG. 18 is the perspective view of the ninth embodiment.
Figure 19:
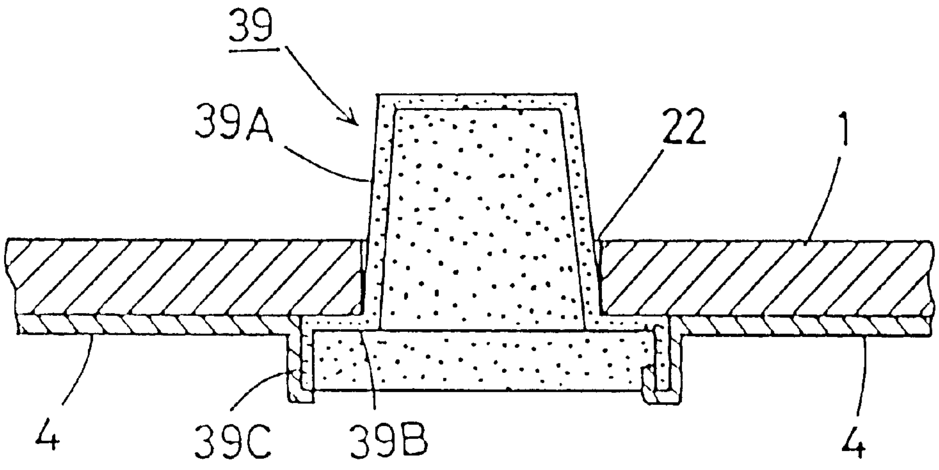
FIG. 19 is the partial sectional view of the ninth embodiment when the masking member is attached.

FIG. 18 and FIG. 19 relate to the ninth embodiment of the present invention. In this embodiment, a masking member (39) consists of an inserting part (39A) having vessel form consisting of a circular bottom and a perpendicular wall which extends upwards from the perimeter of said bottom, a flange (39B) which is extended from the upper edge of said wall, and a perpendicular wall (39C) which extends upwards from the circumference of said flange (39B).

As shown in FIG. 19, said masking member (39) is inserted into a hole (22) of an article (1) in the same way as the seventh embodiment and since a coating layer (4) may be cut by said perpendicular wall (39C) which extends upwards from the circumference of said flange (39B), the removing of said masking member (39) from said hole (22) may be smooth without obstruction of said coating layer (4). Said masking member (39) is easily manufactured by vacuum forming and can be reused in the same way as the seventh embodiment.

Figure 20:
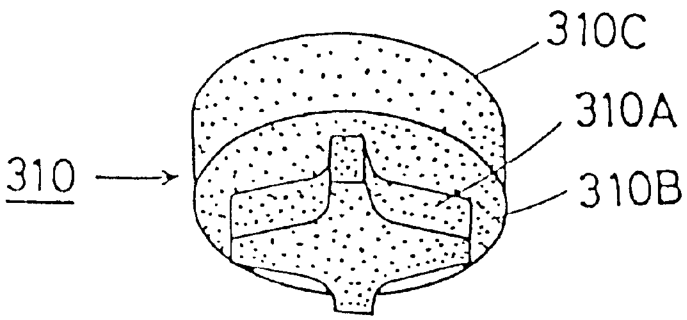
FIG. 20 is the perspective view of the tenth embodiment.

FIG. 20 relates to the tenth embodiment of the present invention. In this embodiment, a masking member (310) consists of an inserting part (310A) having a vessel form consisting of a cross-shaped bottom and a perpendicular wall which extends upwards from the perimeter of said bottom, a flange (310B) which is extended from the upper edge of said wall, and a perpendicular wall (310C) which extends upwards from the circumference of said flange (310B).

Said masking member (310) of this embodiment is used in the same way as the ninth embodiment and further said masking member (310) is supported in the inner wall of said hole by only partially contacting the tip of said inserting part (310A) so that attaching and removing of said masking member (310) to (from) the hole may be very easy. Further, the less material for said masking member (310) may be used than that for the masking member having a cylindrical form. Said masking member (310) is easily manufactured by vacuum forming and can be reused in the same way as the seventh embodiment.

Figure 21:
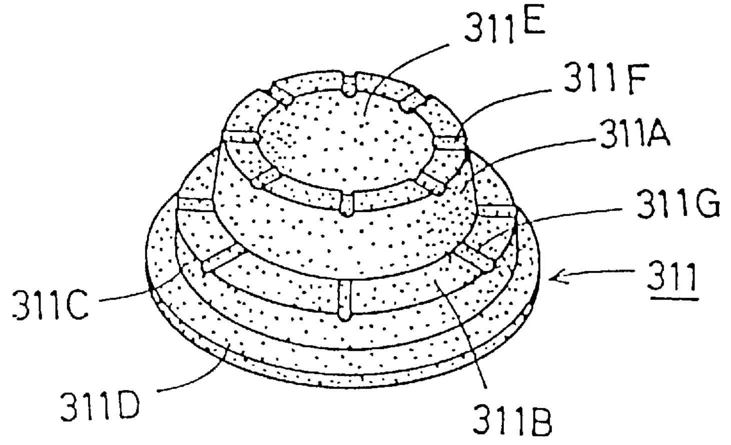
FIG. 21 is the perspective view of the eleventh embodiment.
Figure 22:
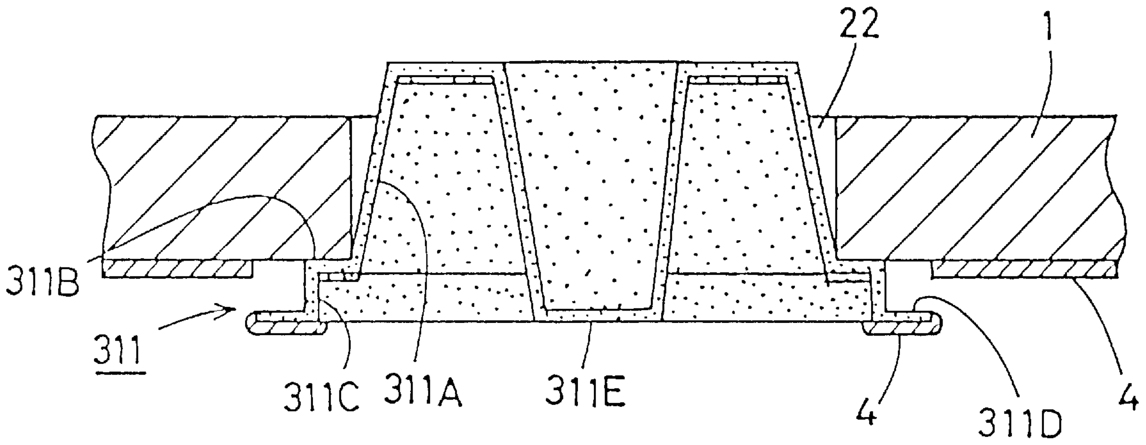
FIG. 22 is the partial sectional view of the eleventh embodiment when the masking member is attached.

FIG. 21 and FIG. 22 relate to the eleventh embodiment of the present invention. In this embodiment, a masking member (311) consists of an inserting part (311A) having a vessel form consisting of a circular bottom from which a grip (311E) is risen and an inner perpendicular wall which extends upwards from the circumference of said bottom, a lower flange (311B) which is extended from the upper part of said wall, an outer perpendicular wall (311C) which extends upwards from the circumference of said lower flange (311B), and an upper flange (311D) which is extended from the upper part of said wall (311C), and plural radiated grooves (311F) and (311G) respectively formed in the bottom of said inserting part (311A) and said lower flange (311B).

As shown in FIG. 22, said masking member (311) is inserted into a hole (22) of an article (1) in the same way as the eighth embodiment and since a coating layer (4) may be cut by said upper flange (311D) of said masking member (311), the removing of said masking member (311) from said hole (22) may be very smooth without obstruction of said coating layer (4) and further said grooves (311F) and (311G) respectively reinforce said lower and upper flanges (311B) and (311D). Said masking member (311) is easily manufactured by vacuum forming and can be reused in the same way as the seventh embodiment.

Figure 23:
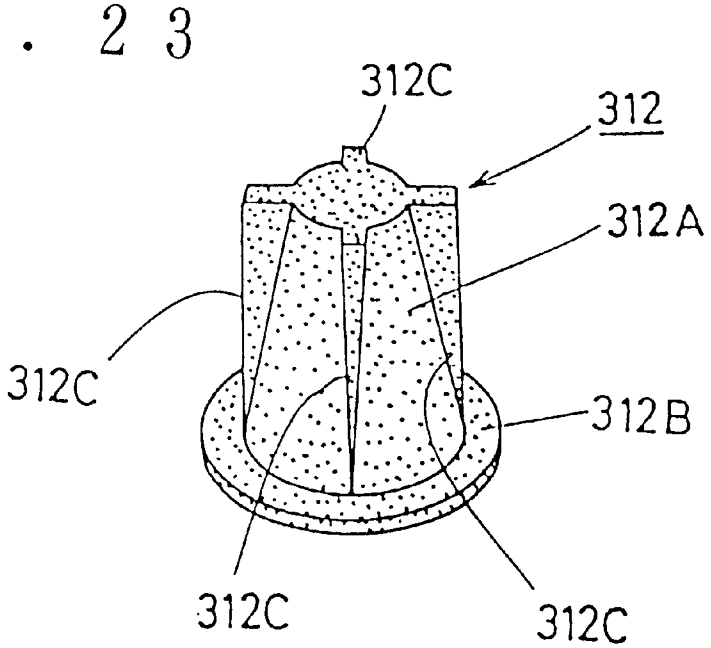
FIG. 23 is the perspective view of the twelfth embodiment.
Figure 24:
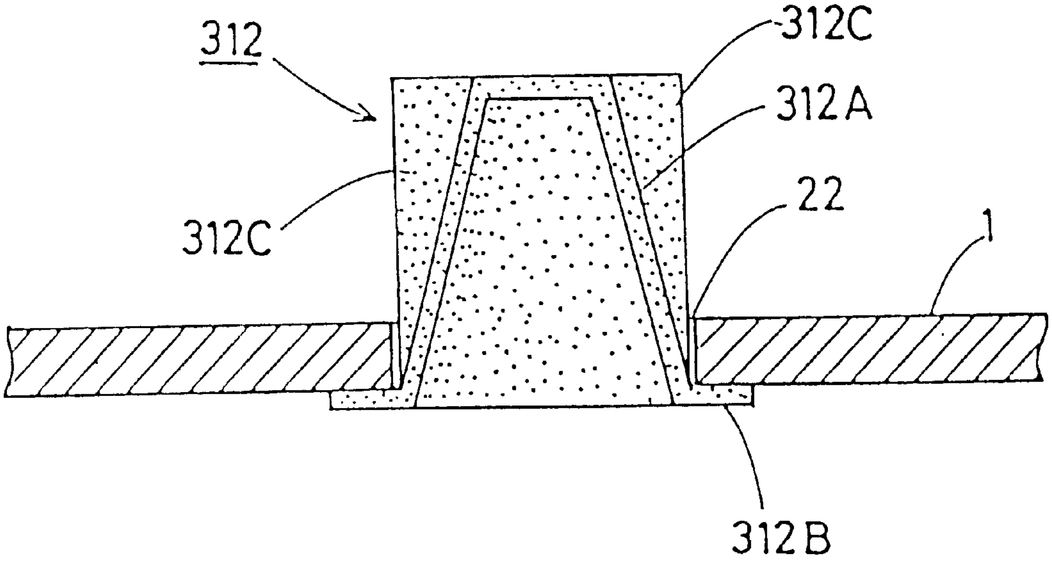
FIG. 24 is the partial sectional view of the twelfth embodiment when the masking member is attached.

FIG. 23 and FIG. 24 relate to the twelfth embodiment of the present invention. In this embodiment, a masking member (312) consists of an inserting part (312A) having a vessel form consisting of a circular bottom and a perpendicular wall which extends upwards from the circumference of said bottom, a flange (312B) which is extended upwards from the upper edge of said wall, and ribs (312C) which are formed on the circumference of said wall. As shown in FIG. 24, said masking member (312) is inserted into a hole (22) of an article (1) in the same way as the seventh embodiment and since said ribs (312C) of said masking member (312) may be fitted elastically to an interior wall of said hole (22), said masking member (312) may never fall into the inside of said hole (22) before and during coating by vibration and further said masking member (312) may be reinforced by said ribs (312C). And said masking member (312) is easily manufactured by vacuum forming and can be reused in the same way as the seventh embodiment.

[Masking member Type D]

Masking member Type D is used to protect the extending part of the article and comprises a PPO-syndiotactic polystyrene polymer alloy. After the vacuum forming of said polymer alloy sheet, said sheet is treated by heating to crystallize said polymer alloy.

Figure 25:
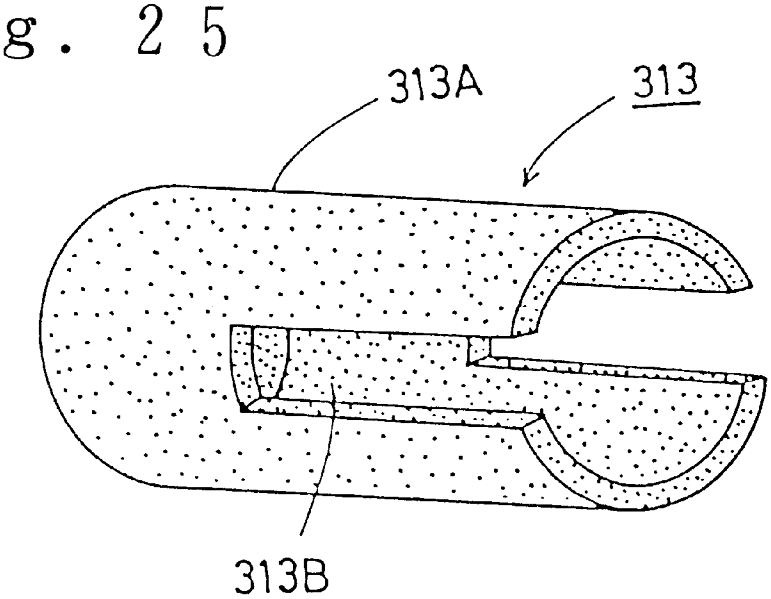
FIG. 25 is the perspective view of the thirteenth embodiment.
Figure 26:
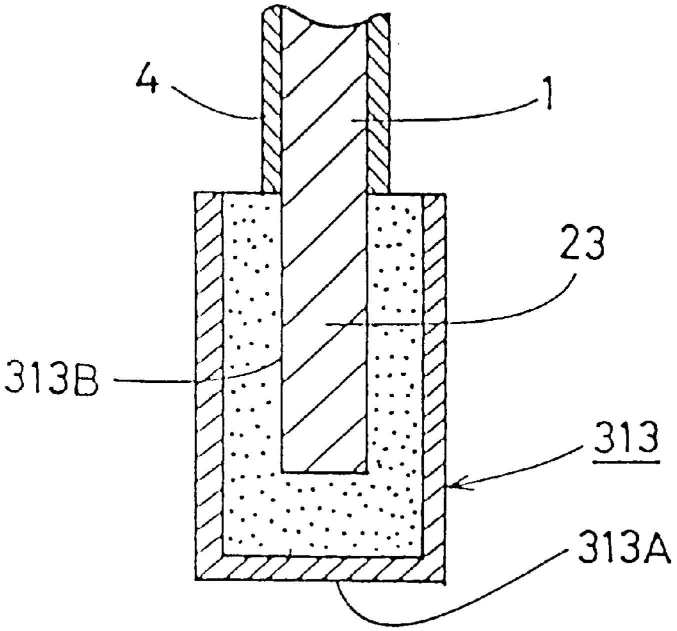
FIG. 26 is the partial sectional view of the thirteenth embodiment when the masking member is attached.

FIG. 25 and FIG. 26 relate to the thirteenth embodiment of the present invention. In this embodiment, a masking member (313) consists of a body (313A) having a cylindrical vessel form, which has a slit (313B) formed from the opening end of said body (313A).

An extending part (23) of the article (1) to be protected is inserted into said slit (313B) of said masking member (313) and the coating layer (4) is not formed on said extending part (23) since said extending part (23) is protected by said masking member (313) as shown in FIG. 26. After coating, said masking member (313) is removed from said extending part (23) by a worker's hand. Said masking member (313) is easily manufactured by vacuum forming and can be reused.

Figure 27:
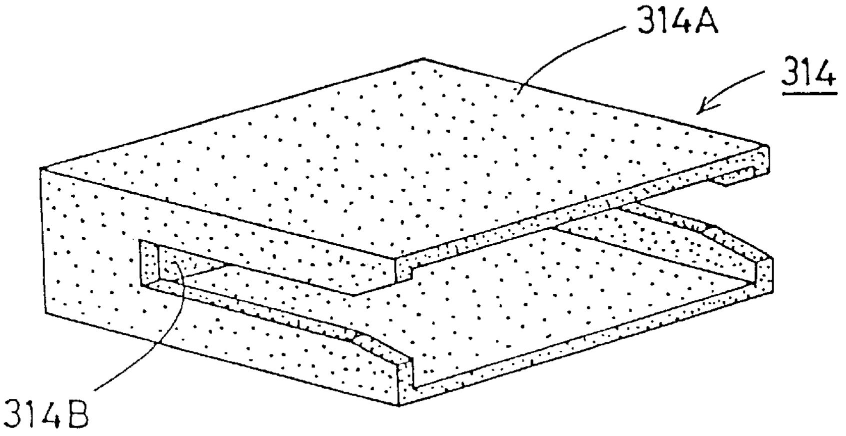
FIG. 27 is the perspective view of the fourteenth embodiment.

FIG. 27 relates to the fourteenth embodiment of the present invention. In this embodiment, a masking member (314) consists of a body (314A) having a rectangular vessel form, which has a slit (314B) formed from the opening end of said body (314A). Said masking member (314) is used in the same way as the thirteenth embodiment, and is easily manufactured by vacuum forming and can be reused.

Figure 28:
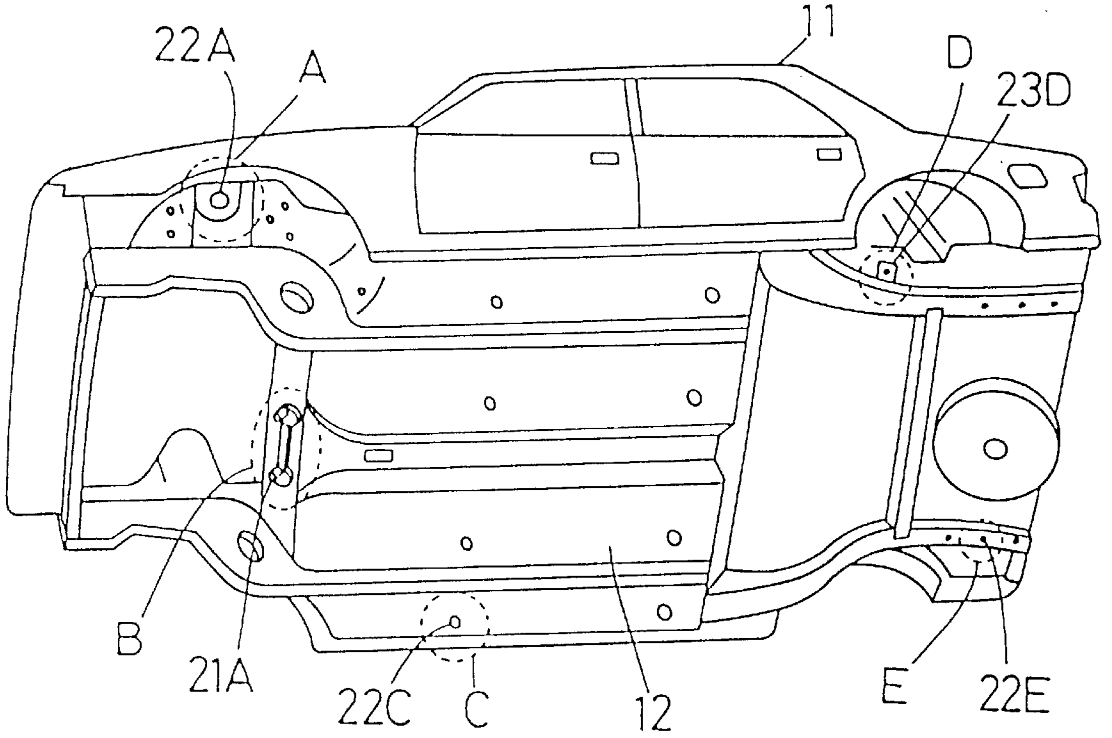
FIG. 28 to FIG. 33 relate to the practical examples of the present invention.
Figure 29:
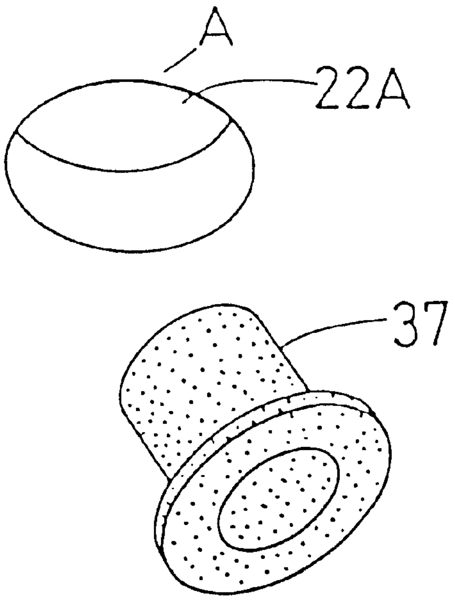
Figure 30:
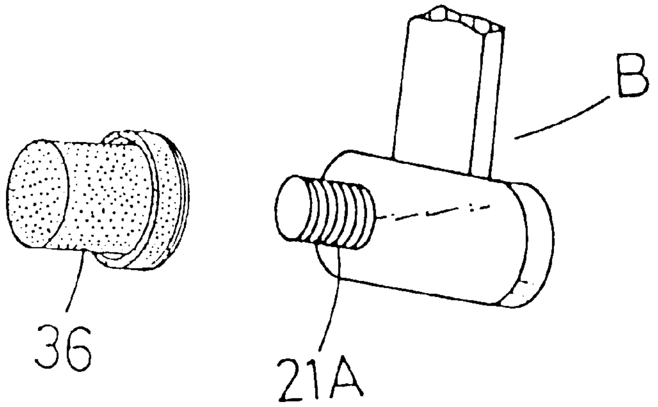
Figure 31:
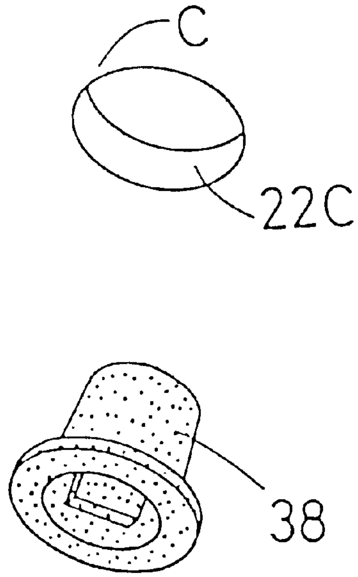
Figure 32:
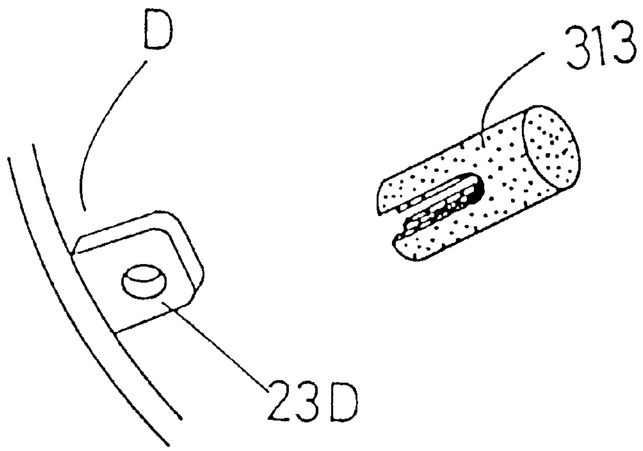
Figure 33:
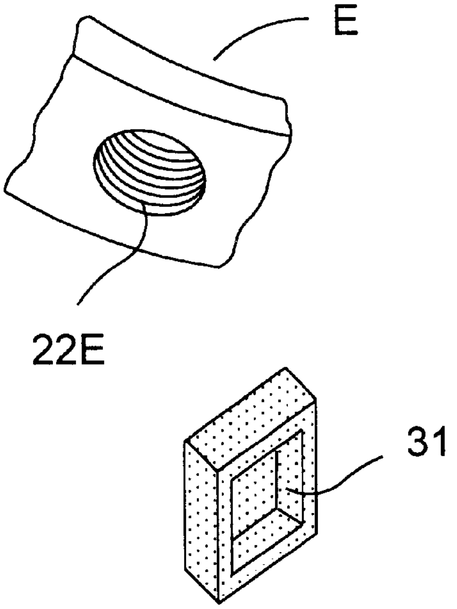
Figure 34:
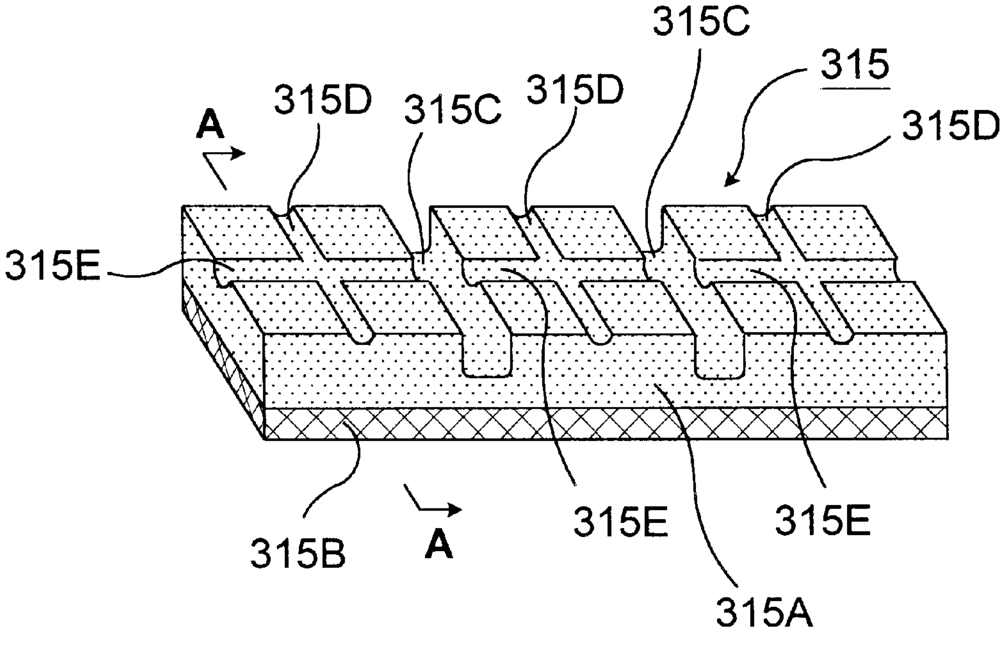
FIG. 34 is the back perspective view of the masking member of the fifteenth embodiment.
Figure 35:
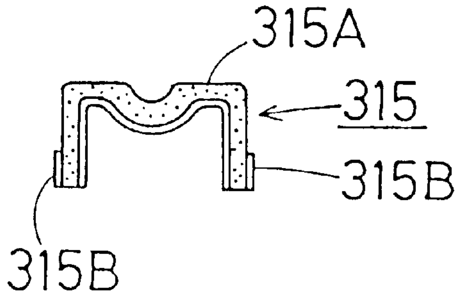
FIG. 35 is the sectional view taken along line A—A of FIG. 34.

FIG. 28 to FIG. 33 relate to an applied embodiment in which the masking members Type A, B, C and D are piled to the under side (12) of the car body (11) for corrosion, sound and vibration-proof. As shown in FIG. 28, the masking members of the present invention are attached to parts A, B, C, D and E of the under side (12) of a car body (11). Namely, as shown in FIG. 29, the masking member Type C, such as said masking member (37) of the seventh embodiment may be attached to a hole (22A) of part A into which a spring axis of a forward wheel is inserted and the circumference of the hole (22A) is used as a bed for the spring. As shown in FIG. 30, the masking member Type B, such as said Type B masking member (36) of the sixth embodiment is attached to a bolt (21A) of part B. As shown in FIG. 31, the Type C masking member (38) of the eighth embodiment is inserted into a drainage hole (22C), as shown in FIG. 32, the masking member (313) of the thirteenth embodiment is attached to a bracket (23D) of part D, and as shown in FIG.33, the Type A masking member (31) of the first embodiment is attached to a screw hole (22E). Thus, said hole (22A), said bolt (21A), said drainage hole (22C), said bracket (23D) and said screw hole (22E) are protected by said masking members of the present invention from coating.

FIG. 34 to FIG. 38 relate to the fifteenth embodiment of the present invention. In this embodiment, a masking member (315) is used to protect a concavity of an article. After the vacuum forming of the two-layer sheet the same as the masking member B, said masking member (315) is manufactured by heat treatment of said sheet, and consists of a body (315A) and an adhesive layer (315B) formed on the circumference of said body (315A).

Figure 36:
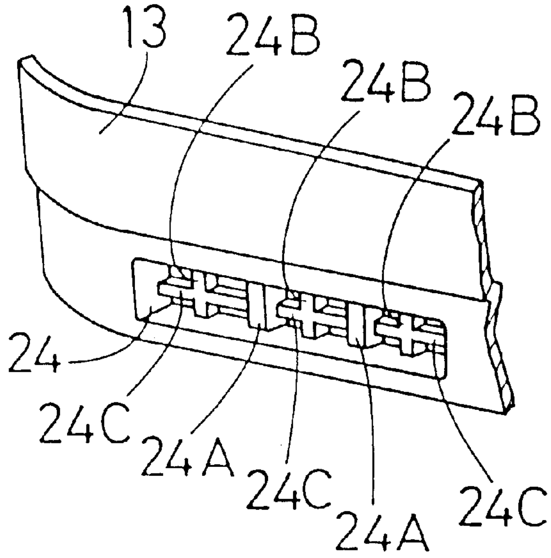
FIG. 36 is the partial perspective view of an air-intake of a bumper.
Figure 37:
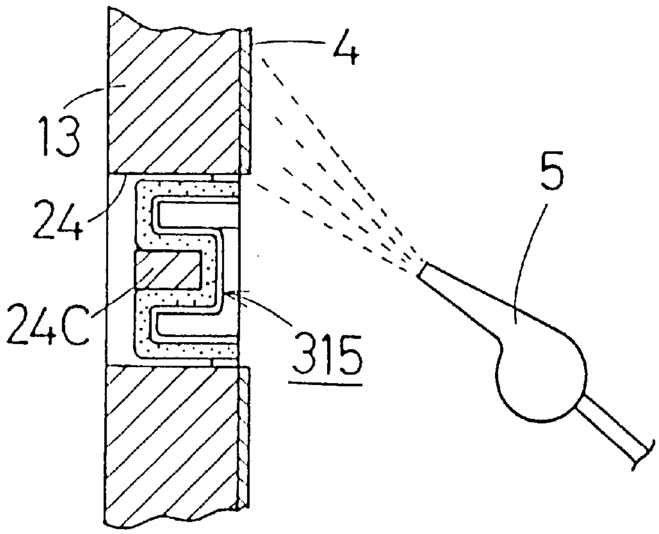
FIG. 37 is the explanatory sectional view of the fifteenth embodiment when a bumper wherein the masking member is attached is being sprayed.

The concavity to which said masking member (315) is to be attached is shown in FIG. 36. In this figure, an air-intake (24) is formed on the under part of a bumper (13), and a pair of pillars (24A), (24A), vertical ribs (24B) and horizontal ribs (24C) are formed inside said air-intake (24A). Said masking member (315) has a pair of pillar fitting parts (315C), (315C), vertical fitting ribs (315D) and horizontal fitting ribs (315E) which are to be fitted to the inner-shape of said air-intake (24). Furthermore, said adhesive layer (315B) may be covered with a release sheet or a protect film or the like, and when said masking member (315) is used, said release sheet is peeled. When said masking member (315) is inserted and attached in said air-intake (24) as shown in FIG. 37, said pillars (24A), (24A) of said air-intake (24) are fitted in said pillar fitting parts (315C), (315C) of said masking member (315), and vertical ribs (24B) and horizontal ribs (24C) of said air-intake (24) are fitted respectively in vertical fitting ribs (315D) and horizontal fitting ribs (315E) of said masking member (315), and further the circumference of said body (315A) of said masking member (315) is fitted firmly in said air-intake (24) by said adhesive layer (315B). In this way, said masking member (315) is fitted and stuck firmly to the inner-shape of said air-intake (24).

Figure 38:
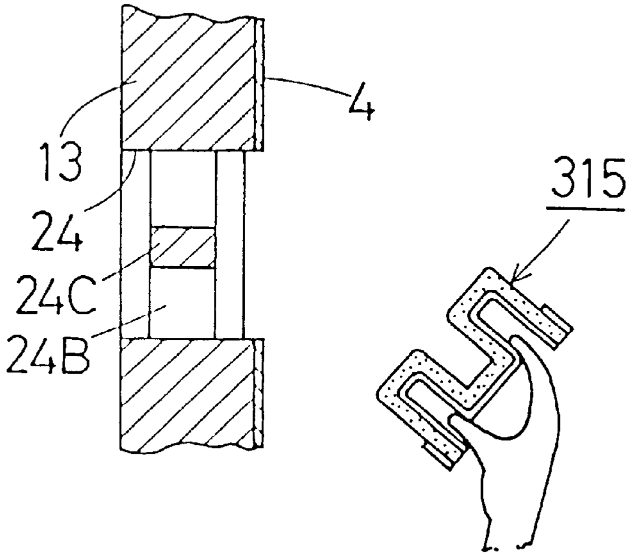
FIG. 38 is the partial sectional view of the fifteenth embodiment when the masking member is removed.

After said masking member (315) is attached to said air-intake (24), when a coating layer (4) is formed by spraying paint on the surrounding of said air-intake (24) with a spray (5) and heating said paint, said coating layer (4) is not formed on said air-intake (24) where said masking member (315) protects as shown in FIG. 37. After coating, said masking member (315) may be removed from said air-intake (24) by a worker's hand as shown in FIG. 38.

Said masking member (315) is easily manufactured by vacuum forming and can be reused without deformation by heating.

Figure 39:
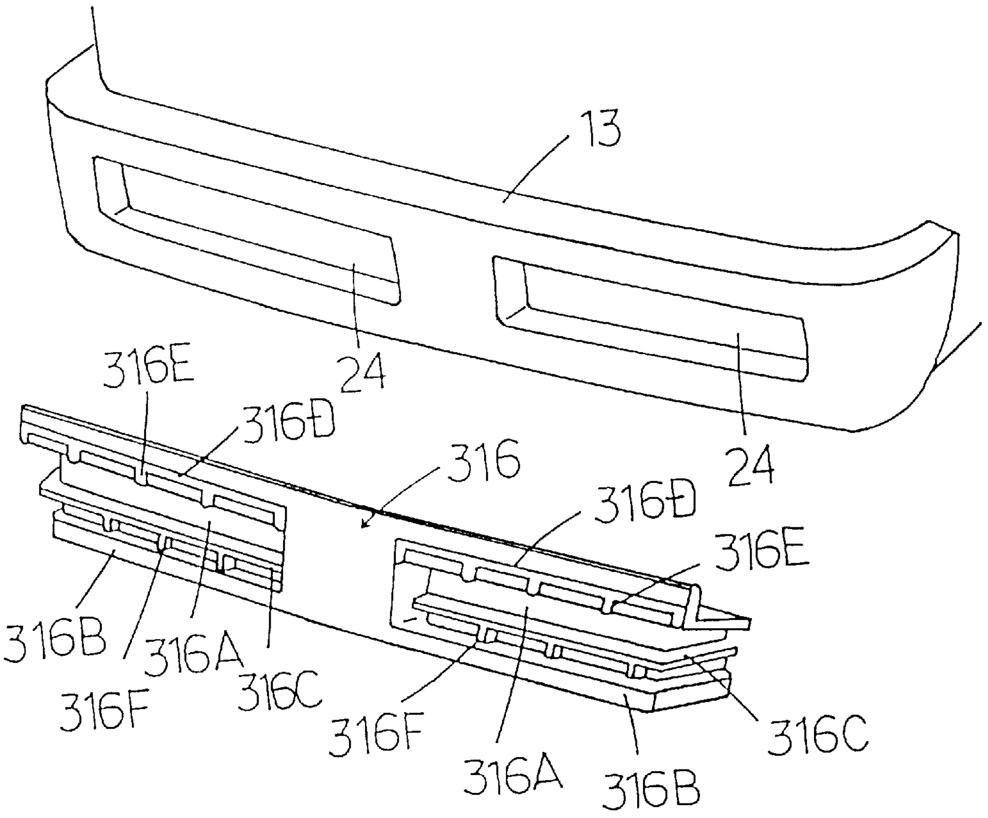
FIG. 39 is the perspective view of the sixteenth embodiment before the masking member is attached.
Figure 40:
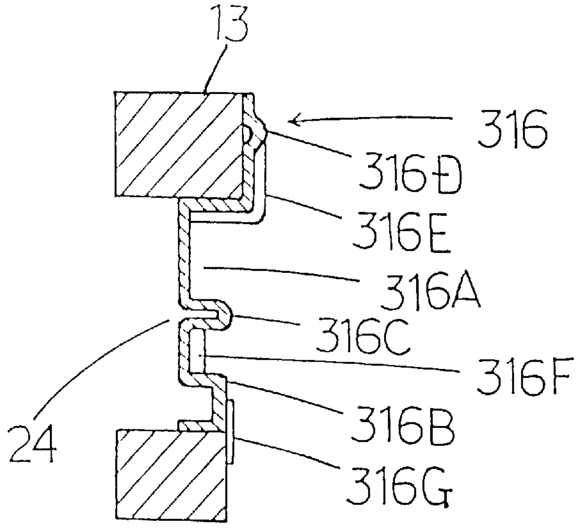
FIG. 40 is the sectional view of the sixteenth embodiment when the masking member is attached.

FIG. 39 and FIG. 40 relate to the sixteenth embodiment of the present invention. In this embodiment, a masking member (316) is used to protect a bumper (13) in the same way as the fifteenth embodiment, and a fitting part (316A) which is fitted in an air-intake (24) of said bumper (13), a flange (316B) having a C-shaped cross section on the lower edge of said fitting part (316A), and horizontal ribs (316C), (316D) and vertical ribs (316E), (316F) for reinforcement are formed in said masking member (316).

When the masking member (316) is attached to the bumper (13) by fitting the fitting part (316A) in the air-intake (24) of said bumper (13), as said fitting part (316A) of said masking member (316) is reinforced by the flange (316B) and prevented from obstruction, fitting is easily achieved. In addition, since the surface of said flange (316B) is substantially on the same plane as the lower edge of said air-intake (24) of said bumper (13) in this state, as shown in FIG. 40, it can easily be fixed thereon by the adhesive tape (316G).

Material for the masking member (316) of above described embodiment is syndiotactic polystyrene (XAREC S120, product of Idemitsu Petrochemical Co., Ltd.).

Figure 41:
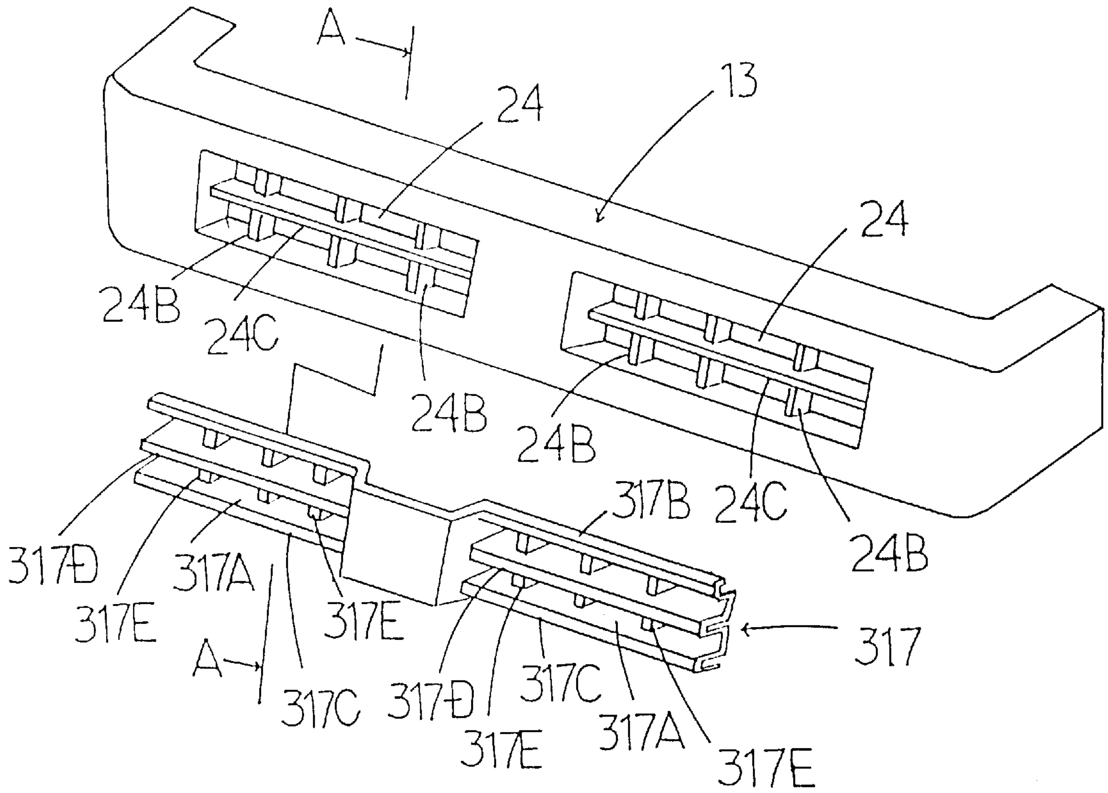
FIG. 41 is the perspective view of the seventeenth embodiment before the masking member is attached.
Figure 42:
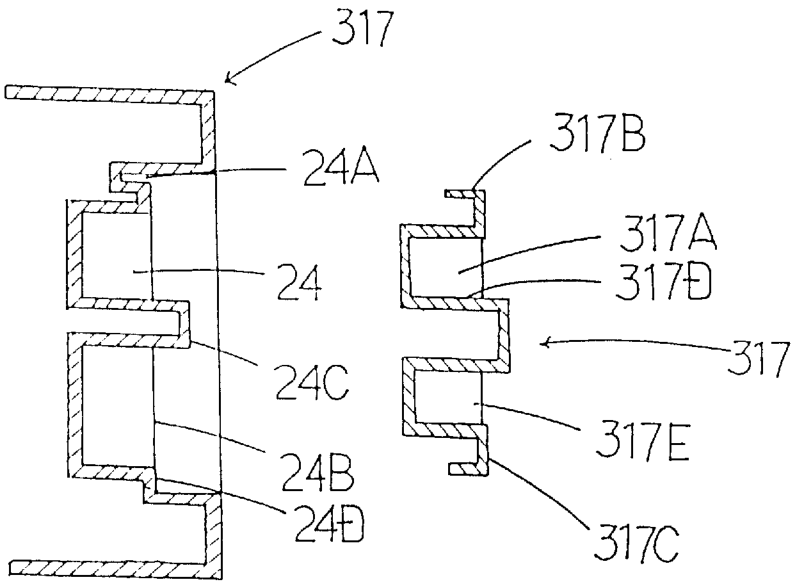
FIG. 42 is the sectional view taken along line A—A of FIG. 41.
Figure 43:
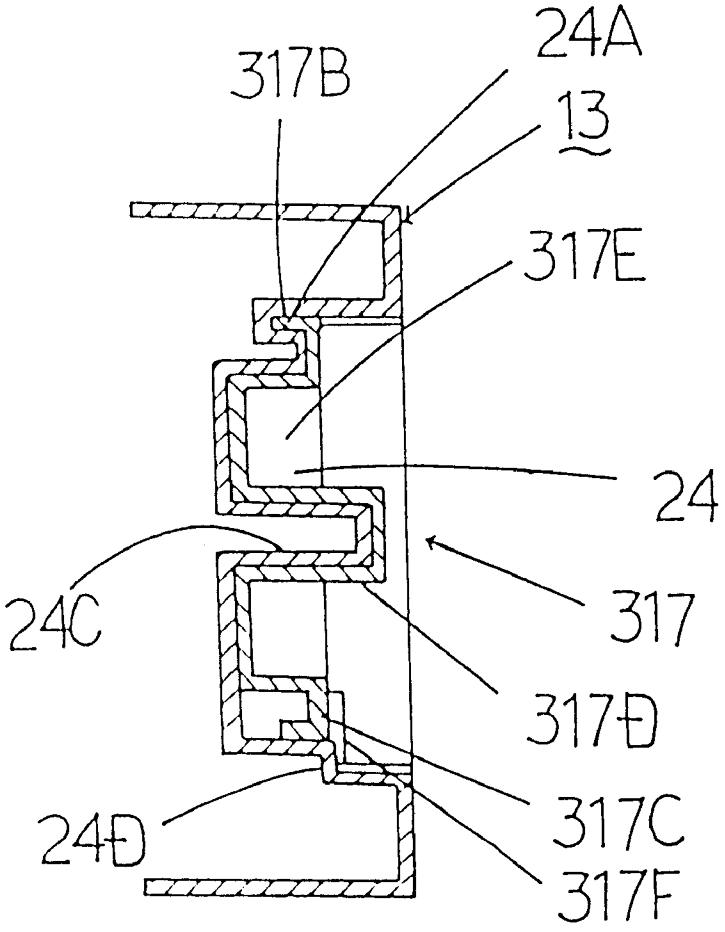
FIG. 43 is the sectional view taken along line A—A of FIG. 41 when the masking member is attached.

FIG. 41 to FIG. 43 relate to the seventeenth embodiment of the present invention. A masking member (317) of this embodiment is also used to protect a bumper (13). A pair of air-intakes (24), (24) is formed on said bumper (13), and vertical ribs (24B), (24B) and horizontal ribs (24C), (24C) are formed inside said air-intakes (24), (24), and further grooves (24A), (24A) are formed on the upper edge of the air-intakes (24), (24) as shown in FIG. 42. Flight parts (24D), (24D) are also formed on the lower edge of the air-intakes (24), (24).

Said masking member (317) is to protect the air-intakes (24), (24) of the bumper (13) from coating, and the masking member (317) has a pair of fitting parts (317A), (317A) which is fitted in the air-intakes (24), (24) of said bumper (13). On the upper edge of said fitting parts (317A), (317A), fitting flanges (317B), (317B) are formed. On the lower edge of said fitting parts (317A), (317A) C-shaped bends (317C), (317C) are formed. Also horizontal fitting ribs (317D), (317D) are formed on said fitting parts (317A), (317A) of said masking member (317).

When the masking member (317) is attached to the bumper (13) by fitting the fitting parts (317A), (317A) in the air-intakes (24), (24) and fitting a horizontal ribs (24C), (24C) and vertical ribs (24B), (24B) of the air-intakes (24), (24) respectively in horizontal fitting ribs (317D), (317D) and vertical fitting ribs (317E), (317E), as shown in FIG. 43, fitting flanges (317B), (317B) on the upper edge of the fitting parts (317A), (317A) of said masking member (317) are fitted in grooves (24A), (24A) without using the adhesive tape. Since the lower edge of the fitting parts (317A), (317A) is reinforced by the bends (317C), (317C) and is protected from deformation, fitting is easily achieved. Since the surface of said bends (317C), (317C) is substantially on the same plane as the flight parts (24D), (24D) of said air-intakes (24), (24) of the bumper (13) in this state, as shown in FIG. 43, it can easily be fixed thereon by the adhesive tape (312F). Material for the masking member (317) of this embodiment is syndiotactic polystyrene the same as the sixteenth embodiment.

Figure 44:
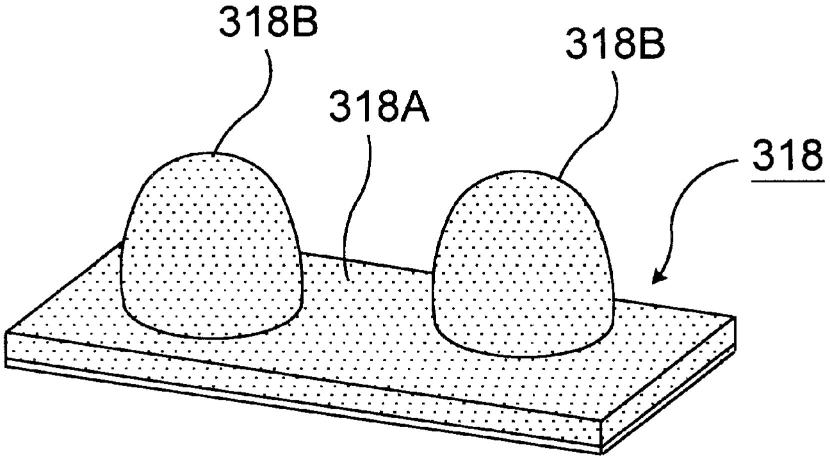
FIG. 44 is the perspective view of the eighteenth embodiment.
Figure 45:
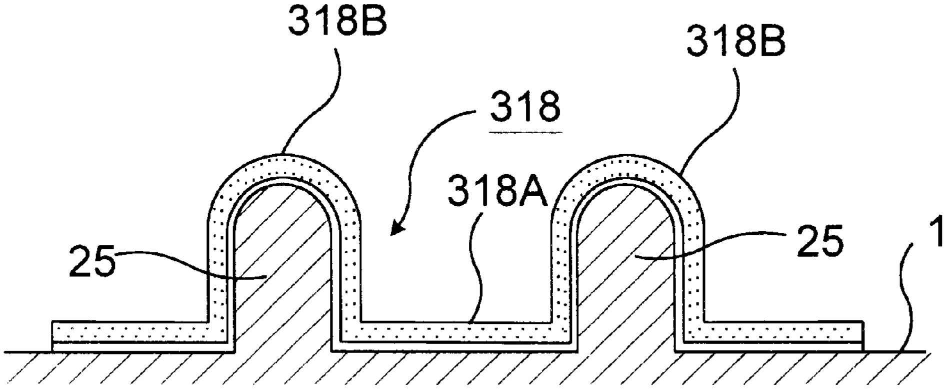
FIG. 45 is the sectional view of the eighteenth embodiment when the masking member is attached.

FIG. 44 and FIG. 45 relate to the eighteenth embodiment of the present invention. In this embodiment, a masking member (318) is used to protect plural protrusions (25) (25) of an article from surface treatment. Said masking member (318) comprises a body (318A) and fitting parts (318B), (318B) projected from said body (318A), with said body (318A) manufactured by vacuum forming of the laminated sheet in the same way as the fifteenth embodiment.

Said masking member (318) is attached to said plural protrusions (25), (25) of an article (1) by said fitting parts (318B), (318B) to protect said parts (25), (25) of said article from said surface treatment as shown in FIG. 45. Said masking member (318) is easily manufactured by vacuum forming and can be reused the same as the fifteenth embodiment.

Figure 46:
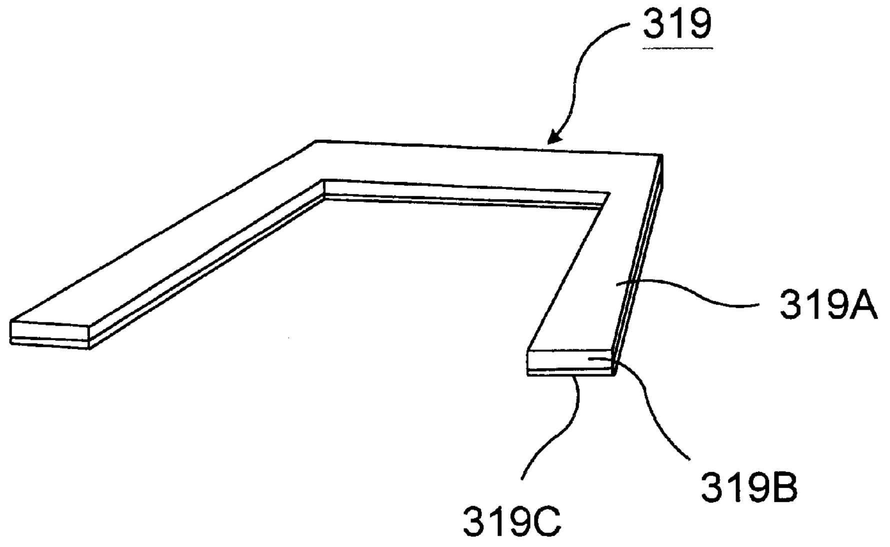
FIG. 46 is the perspective view of the nineteenth embodiment.
Figure 47:
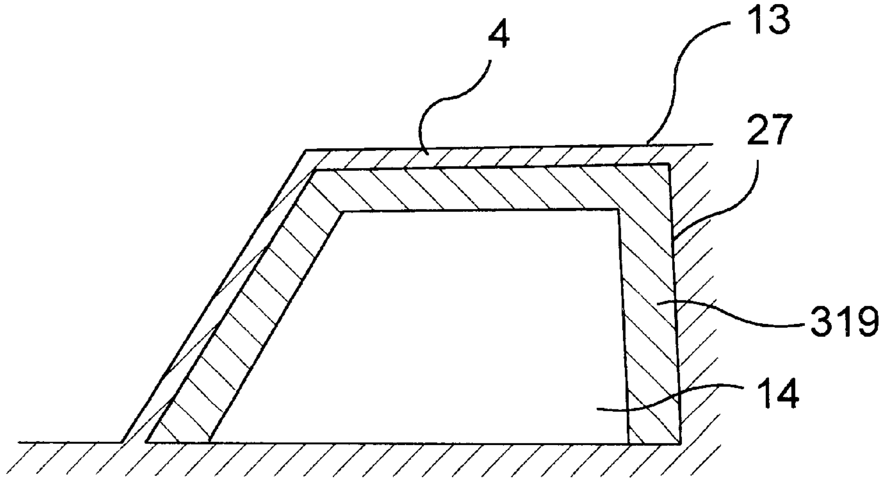
FIG. 47 is the explanatory view of the nineteenth embodiment when the masking member is attached.
Figure 48:
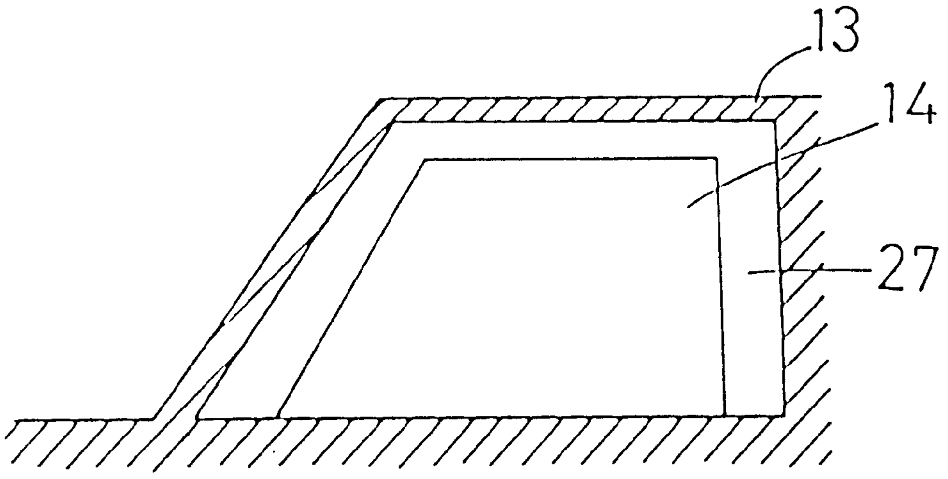
FIG. 48 is the explanatory view of the nineteenth embodiment when the masking member is removed.

FIG. 46 to FIG. 48 relate to the nineteenth embodiment of the present invention. In this embodiment, a masking member (319) is used to protect the even part of an article. Said masking member (319) consists of a body (319A) consisting of the laminated sheet the same as the fifteenth embodiment and an adhesive layer (319B) formed on the backside of said body (319A), and said adhesive layer (319B) is covered with a release sheet (319C).

Said masking member (319), wherein said release sheet (319C) is peeled, is attached to the circumference (27) of a window (14) of a car (13) by said adhesive layer (319B) as shown in FIG. 47. After that, a coating layer (4) is formed by coating paint on the car (13) and heating said paint. After said coating, said masking member (319) may be removed from the circumference (27) of the window (14). Since the circumference (27) of the window (14) is protected by said masking member (319) during said coating, the coating layer (4) is not formed on the circumference (27) as shown in FIG. 48. Said masking member (319) is easily manufactured by vacuum forming and can be reused without deformation by heating.

Figure 49:
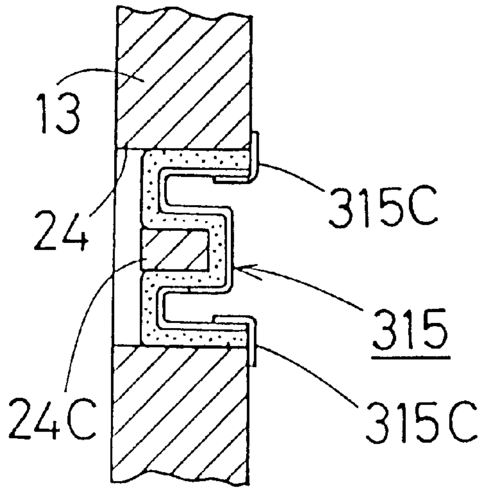
FIG. 49 is the explanatory partial sectional view of the fifteenth embodiment when the masking member is fixed by an adhesive tape.
Figure 50:
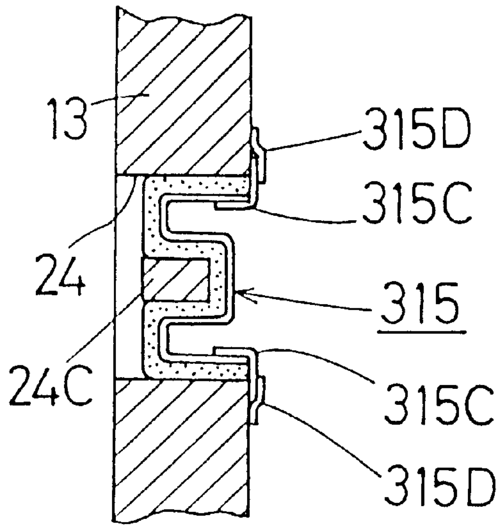
FIG. 50 is the explanatory partial sectional view of the fifteenth embodiment when a dividing tape is attached furthermore.

Other than the embodiments above described, a masking member (315) may be fixed inside an air-intake (24) by attaching an adhesive tape (315C) on the masking member (315) and the surrounding of the air-intake (24) as shown in FIG. 49, instead of forming an adhesive layer (315B) on the circumference of a body (315A) of a masking member (315) in the fifteenth embodiment. The adhesive tape (315C) may be attached to all the circumferences of the masking member (315), or may be attached partially. And further, the adhesive tape (315D) may be attached over the adhesive tape (315C) to clarify the border between the coating part and the non-coating part as shown in FIG. 50. This adhesive tape (315D) is called a bordering tape, and is used in a case where the masking member (315) is fixed by the adhesive layer (315B) as an occasion demands.

[EFFECT OF THE INVENTION]

A masking member which can be used repeatedly even in surface treatment having a heating process at a high temperature.

What is claimed is:

1. A masking member comprising a plastic produced by polymerization using a metallocene compound as a catalyst wherein said masking member is molded in a desired shape corresponding to a position to be protected by said masking member.

2. A masking member comprising a polymer alloy containing a plastic produced by polymerization using a metallocene compound as a catalyst wherein said masking member is molded in a desired shape corresponding to a position to be protected by said masking member.

3. A masking member in accordance with claim 1, wherein said plastic is a polyolefin resin.

4. A masking member in accordance with claim 1, wherein said plastic is a polystyrene resin.

5. A masking member in accordance with claim 4, wherein said polystyrene resin is a syndiotactic polystyrene resin.

6. A masking member in accordance with claim 2, wherein said plastic is a polyolefin resin.

7. A masking member in accordance with claim 2, wherein said plastic is a polystyrene resin.

8. A masking member in accordance with claim 7, wherein said polystyrene resin is a syndiotactic polystyrene resin.

* * * * *